US011858631B2

(12) United States Patent
McGrew et al.

(10) Patent No.: US 11,858,631 B2
(45) Date of Patent: Jan. 2, 2024

(54) AERIAL LAUNCH AND/OR RECOVERY FOR UNMANNED AIRCRAFT WITH SUBMERSIBLE DEVICES, AND ASSOCIATED SYSTEMS AND METHODS

(71) Applicant: Insitu, Inc., Bingen, WA (US)

(72) Inventors: James Statelar McGrew, Husum, WA (US); Peter Josef Kunz, The Dalles, OR (US); Rolf Theodoor Rysdyk, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 318 days.

(21) Appl. No.: 17/133,055

(22) Filed: Dec. 23, 2020

(65) Prior Publication Data

US 2021/0371104 A1 Dec. 2, 2021

Related U.S. Application Data

(62) Division of application No. 15/269,597, filed on Sep. 19, 2016, now Pat. No. 10,933,997.

(Continued)

(51) Int. Cl.
*B64U 70/30* (2023.01)
*B64D 5/00* (2006.01)
(Continued)

(52) U.S. Cl.
CPC ............... *B64D 5/00* (2013.01); *B63B 21/50* (2013.01); *B64C 27/08* (2013.01);
(Continued)

(58) Field of Classification Search
CPC .......... B64C 2201/08; B64C 2201/082; B64C 2201/182; B63B 21/48; B64F 1/029; B64U 10/60; B64U 70/20; B64U 70/30
See application file for complete search history.

(56) References Cited

U.S. PATENT DOCUMENTS

| 965,881 A | 8/1910 | Draper |
| 968,339 A | 8/1910 | Geraldson |

(Continued)

FOREIGN PATENT DOCUMENTS

| CN | 1032645 | 5/1989 |
| DE | 4301671 | 7/1993 |

(Continued)

OTHER PUBLICATIONS

China National Intellectual Property Administration, "Notification of Second Office Action," issued in connection with Chinese Patent Application No. 2016108605105, dated May 7, 2021, 5 pages.

(Continued)

*Primary Examiner* — Christopher D Hutchens
*Assistant Examiner* — Michael A. Fabula
(74) *Attorney, Agent, or Firm* — HANLEY, FLIGHT & ZIMMERMAN, LLC

(57) ABSTRACT

Aerial launch and/or recovery for unmanned aircraft, and associated systems and methods. A representative unmanned aerial vehicle (UAV) comprises an airframe, a plurality of rotors, and a capture line. The rotors are coupled to the airframe and configured to support the UAV in hover. The capture line is carried by the UAV and is operatively coupled to an immersible anchor. The immersible anchor is configured to be immersed within a body of water during a capture operation involving the capture line.

20 Claims, 11 Drawing Sheets

Related U.S. Application Data

(60) Provisional application No. 62/311,773, filed on Mar. 22, 2016, provisional application No. 62/236,824, filed on Oct. 2, 2015.

(51) Int. Cl.

| | | |
|---|---|---|
| *B64C 39/02* | (2023.01) | |
| *B63B 21/50* | (2006.01) | |
| *B64C 27/08* | (2023.01) | |
| *B64C 29/00* | (2006.01) | |
| *B64U 10/10* | (2023.01) | |
| *B64U 10/25* | (2023.01) | |
| *B64U 30/00* | (2023.01) | |
| *B64U 30/20* | (2023.01) | |
| *B64U 50/13* | (2023.01) | |
| *B64U 50/34* | (2023.01) | |
| *B64U 70/20* | (2023.01) | |

(52) U.S. Cl.
CPC ........ *B64C 29/0025* (2013.01); *B64C 39/024* (2013.01); *B64C 39/026* (2013.01); *B64U 10/10* (2023.01); *B64U 10/25* (2023.01); *B64U 30/00* (2023.01); *B64U 30/20* (2023.01); *B64U 50/13* (2023.01); *B64U 50/34* (2023.01); *B64U 70/20* (2023.01); *B64U 70/30* (2023.01); *B64U 2201/10* (2023.01)

(56) References Cited

U.S. PATENT DOCUMENTS

| | | |
|---|---|---|
| 975,953 A | 11/1910 | Hourwich |
| 1,144,505 A | 6/1915 | Steffan |
| 1,164,967 A | 12/1915 | Thorp |
| 1,317,631 A | 9/1919 | Kinser |
| 1,383,595 A | 7/1921 | Black |
| 1,384,036 A | 7/1921 | Anderson |
| 1,499,472 A | 7/1921 | Pratt |
| 1,428,163 A | 9/1922 | Harriss |
| 1,530,010 A | 3/1925 | Neilson |
| 1,532,736 A | 4/1925 | Dodds |
| 1,556,348 A | 10/1925 | Ray et al. |
| 1,624,188 A | 4/1927 | Simon |
| RE16,613 E | 5/1927 | Moody et al. |
| 1,634,964 A | 7/1927 | Steinmetz |
| 1,680,473 A | 8/1928 | Parker |
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |
| 1,748,663 A | 2/1930 | Tucker |
| 1,749,769 A | 3/1930 | Johnson |
| 1,756,747 A | 4/1930 | Holland |
| 1,777,167 A | 9/1930 | Forbes |
| 1,816,976 A | 8/1931 | Kirkham |
| 1,825,578 A | 9/1931 | Cernuda |
| 1,836,010 A | 12/1931 | Audrain |
| 1,842,432 A | 1/1932 | Stanton |
| 1,869,506 A | 8/1932 | Richardson |
| 1,892,537 A | 12/1932 | Prager |
| 1,909,445 A | 5/1933 | Ahola |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,211,089 A | 8/1940 | Berlin |
| 2,286,381 A | 6/1942 | Rubissow |
| 2,296,988 A | 9/1942 | Endter |
| 2,333,559 A | 11/1943 | Grady et al. |
| 2,342,773 A | 2/1944 | Wellman |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,401,853 A | 6/1946 | Bailey |
| 2,435,197 A | 2/1948 | Brodie |
| 2,436,240 A | 2/1948 | Wiertz |
| 2,447,945 A | 8/1948 | Knowler |
| 2,448,209 A | 8/1948 | Boyer et al. |
| 2,465,936 A | 3/1949 | Schultz |
| 2,488,050 A | 11/1949 | Brodie |
| 2,488,051 A | 11/1949 | Brodie |
| 2,515,205 A | 7/1950 | Fieux |
| 2,526,348 A | 10/1950 | Gouge |
| 2,735,391 A | 2/1953 | Buschers |
| 2,669,403 A | 2/1954 | Milligan |
| 2,671,938 A | 3/1954 | Roberts |
| 2,684,219 A | 7/1954 | Thunbo |
| 2,692,120 A * | 10/1954 | Cotton ............... B64D 1/22 244/110 G |
| 2,787,185 A | 4/1957 | Rea et al. |
| 2,814,453 A | 11/1957 | Trimble, Jr. et al. |
| 2,843,337 A | 7/1958 | Bennett |
| 2,843,342 A | 7/1958 | Ward |
| 2,844,340 A | 7/1958 | Daniels et al. |
| 2,908,240 A | 10/1959 | Hodge |
| 2,919,871 A | 1/1960 | Sorensen |
| 2,933,183 A | 4/1960 | Koelsch |
| 2,937,824 A | 5/1960 | Krumbholz et al. |
| 2,954,946 A | 10/1960 | O'Neil et al. |
| 3,041,937 A | 7/1962 | Toomey |
| 3,069,118 A | 12/1962 | Bernard |
| 3,163,380 A | 12/1964 | Brodie |
| 3,268,090 A | 8/1966 | Wirkkala |
| 3,411,398 A | 11/1968 | Blakeley et al. |
| 3,454,244 A | 7/1969 | Walander |
| 3,459,151 A * | 8/1969 | Chiba .................. B63B 21/48 114/311 |
| 3,468,500 A | 9/1969 | Carlsson |
| 3,484,061 A | 12/1969 | Niemkiewicz |
| 3,512,447 A | 5/1970 | Vaughn |
| 3,516,626 A | 6/1970 | Strance et al. |
| 3,589,651 A | 6/1971 | Niemkiewicz et al. |
| 3,612,448 A * | 10/1971 | Frieder ................ B64D 1/02 244/138 R |
| 3,657,956 A | 4/1972 | Bradley et al. |
| 3,672,214 A | 6/1972 | Yasuda |
| 3,765,625 A | 10/1973 | Myhr et al. |
| 3,771,484 A | 11/1973 | Schott et al. |
| 3,788,262 A * | 1/1974 | Roberts ................ B63B 21/48 114/253 |
| 3,827,660 A | 8/1974 | Doolittle |
| 3,939,988 A | 2/1976 | Wellman |
| 3,943,657 A | 3/1976 | Leckie |
| 3,980,259 A | 9/1976 | Greenhalgh et al. |
| 4,037,807 A | 7/1977 | Johnston et al. |
| 4,067,139 A | 1/1978 | Pinkerton et al. |
| 4,076,901 A | 3/1978 | Mayhew et al. |
| 4,143,840 A | 3/1979 | Bernard et al. |
| 4,147,317 A | 4/1979 | Mayhew et al. |
| 4,149,840 A | 4/1979 | Tippmann |
| D256,816 S | 9/1980 | McMahon et al. |
| 4,236,686 A | 12/1980 | Barthelme et al. |
| 4,238,093 A | 12/1980 | Siegel et al. |
| 4,267,987 A | 5/1981 | McDonnell |
| 4,279,195 A | 7/1981 | Miller |
| 4,286,898 A | 9/1981 | Stafford |
| 4,296,894 A | 10/1981 | Schnäbele et al. |
| 4,311,290 A | 1/1982 | Koper |
| 4,347,777 A | 9/1982 | Jakubowski, Jr. et al. |
| 4,372,016 A | 2/1983 | LaViolette et al. |
| 4,392,411 A | 7/1983 | Minkler |
| 4,408,737 A | 10/1983 | Schwaerzler |
| 4,410,151 A | 10/1983 | Höppner et al. |
| 4,457,479 A | 7/1984 | Daude |
| 4,471,923 A | 9/1984 | Höppner et al. |
| 4,523,729 A | 6/1985 | Frick |
| 4,566,658 A | 1/1986 | DiGiovanniantonio et al. |

(56) References Cited

U.S. PATENT DOCUMENTS

| | | |
|---|---|---|
| 4,645,142 A | 2/1987 | Soelter |
| 4,653,706 A | 3/1987 | Ragiab |
| 4,678,143 A | 7/1987 | Griffin |
| 4,730,193 A | 3/1988 | Schwartz et al. |
| 4,750,404 A | 6/1988 | Dale |
| 4,753,400 A | 6/1988 | Reuter et al. |
| 4,785,710 A | 11/1988 | Schofield |
| 4,790,497 A | 12/1988 | Yoffe |
| 4,809,933 A | 3/1989 | Buzby et al. |
| 4,842,222 A | 6/1989 | Baird |
| 4,909,548 A | 3/1990 | Welkey |
| 4,926,740 A | 5/1990 | Griffin et al. |
| 4,979,701 A | 12/1990 | Colarik et al. |
| 4,991,739 A | 2/1991 | Levasseur |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor |
| 5,060,888 A | 10/1991 | Vezain et al. |
| 5,109,788 A | 5/1992 | Heinzmann |
| 5,119,935 A | 6/1992 | Stump et al. |
| 5,145,129 A | 9/1992 | Gebhard |
| 5,176,339 A | 1/1993 | Schmidt |
| 5,222,694 A | 6/1993 | Smoot |
| 5,253,605 A | 10/1993 | Colllins |
| 5,253,606 A | 10/1993 | Ortelli |
| 5,259,574 A | 11/1993 | Carrot |
| 5,378,851 A | 1/1995 | Brooke et al. |
| 5,390,550 A | 2/1995 | Miller |
| 5,407,153 A | 4/1995 | Kirk et al. |
| 5,421,239 A | 6/1995 | Sanderson |
| 5,465,923 A | 11/1995 | Milner |
| 5,509,624 A | 4/1996 | Takahashi |
| 5,583,311 A | 12/1996 | Rieger |
| 5,603,592 A | 2/1997 | Sadri et al. |
| 5,655,944 A | 8/1997 | Fusselman |
| 5,687,930 A | 11/1997 | Wagner et al. |
| 5,762,456 A | 6/1998 | Aasgaard |
| 5,816,761 A | 10/1998 | Cassatt et al. |
| 5,906,336 A | 5/1999 | Eckstein |
| 5,913,479 A | 6/1999 | Westwood, III |
| 6,161,797 A | 12/2000 | Kirk et al. |
| 6,237,875 B1 | 5/2001 | Menne et al. |
| 6,264,140 B1 * | 7/2001 | McGeer ............... B64F 1/0295 244/116 |
| 6,343,768 B1 | 2/2002 | Muldoon |
| 6,370,455 B1 | 4/2002 | Larson et al. |
| 6,371,410 B1 | 4/2002 | Cairo-Iocco et al. |
| 6,416,019 B1 | 7/2002 | Hilliard et al. |
| 6,442,460 B1 | 8/2002 | Larson et al. |
| 6,457,673 B1 | 10/2002 | Miller |
| 6,478,650 B1 | 11/2002 | Tsai |
| 6,626,077 B1 | 9/2003 | Gilbert |
| 6,695,255 B1 | 2/2004 | Husain |
| 6,758,440 B1 | 7/2004 | Repp et al. |
| 6,772,488 B1 | 8/2004 | Jensen et al. |
| 6,835,045 B1 | 12/2004 | Barbee et al. |
| 6,874,729 B1 | 4/2005 | McDonnell |
| 6,925,690 B2 | 8/2005 | Sievers |
| 7,059,564 B2 | 6/2006 | Dennis |
| 7,066,430 B2 | 6/2006 | Dennis et al. |
| 7,090,166 B2 | 8/2006 | Dennis et al. |
| 7,114,680 B2 | 10/2006 | Dennis |
| 7,121,507 B2 | 10/2006 | Dennis et al. |
| 7,128,294 B2 | 10/2006 | Roeseler et al. |
| 7,140,575 B2 | 11/2006 | McGeer et al. |
| 7,143,974 B2 | 12/2006 | Roeseler et al. |
| 7,152,827 B2 | 12/2006 | McGeer |
| 7,155,322 B2 | 12/2006 | Nakahara et al. |
| 7,165,746 B2 | 1/2007 | Audren |
| 7,175,135 B2 | 2/2007 | Dennis et al. |
| 7,219,856 B2 | 5/2007 | Watts et al. |
| 7,259,357 B2 | 8/2007 | Walker |
| 7,264,204 B1 * | 9/2007 | Portmann ............. B63B 35/50 244/110 F |
| 7,410,125 B2 | 8/2008 | Steele |
| 7,422,178 B2 | 9/2008 | DeLaune |
| 7,472,461 B2 | 1/2009 | Anstee |
| 7,510,145 B2 | 3/2009 | Snediker |
| 7,578,467 B2 | 8/2009 | Goodrich |
| 7,610,841 B2 * | 11/2009 | Padan ................. B64D 37/12 89/1.8 |
| 7,686,247 B1 | 3/2010 | Monson et al. |
| 7,740,210 B2 | 6/2010 | Pilon et al. |
| 7,748,661 B2 | 7/2010 | Harris et al. |
| 7,798,445 B2 | 9/2010 | Heppe et al. |
| 7,806,366 B2 | 10/2010 | Jackson |
| 8,016,073 B2 | 9/2011 | Petzl et al. |
| 8,028,952 B2 | 10/2011 | Urnes, Sr. |
| 8,038,090 B2 | 10/2011 | Wilson et al. |
| 8,136,766 B2 | 3/2012 | Dennis |
| 8,172,177 B2 | 5/2012 | Lovell et al. |
| 8,205,537 B1 | 6/2012 | Dupont |
| 8,313,057 B2 | 11/2012 | Rednikov |
| 8,348,717 B2 | 1/2013 | Newton et al. |
| 8,387,540 B2 | 3/2013 | Merems |
| 8,607,682 B2 | 12/2013 | Zätterqvist |
| 8,683,770 B2 | 4/2014 | diGirolamo et al. |
| 8,740,134 B2 | 6/2014 | Suzuki |
| 8,820,698 B2 | 9/2014 | Balfour et al. |
| 8,944,373 B2 | 2/2015 | Dickson et al. |
| 8,950,124 B2 | 2/2015 | Wellershoff |
| 8,950,698 B1 | 2/2015 | Rossi |
| 9,085,362 B1 | 7/2015 | Kilian et al. |
| 9,340,301 B2 | 5/2016 | Dickson et al. |
| 9,359,075 B1 | 6/2016 | vonFlotow et al. |
| 9,475,575 B2 | 10/2016 | Rossi |
| 9,932,110 B2 | 4/2018 | McNally |
| 10,133,272 B2 | 11/2018 | Davidson |
| 2002/0011223 A1 | 1/2002 | Zauner et al. |
| 2002/0049447 A1 | 4/2002 | Li |
| 2002/0100838 A1 * | 8/2002 | McGeer ............... B64C 39/024 244/116 |
| 2002/0190162 A1 | 12/2002 | McDonnell |
| 2003/0116107 A1 | 6/2003 | Laimbock |
| 2003/0122384 A1 | 7/2003 | Swanson et al. |
| 2003/0202861 A1 | 10/2003 | Nelson et al. |
| 2003/0222173 A1 | 12/2003 | McGeer et al. |
| 2004/0129833 A1 | 7/2004 | Perlo et al. |
| 2004/0232282 A1 * | 11/2004 | Dennis ................. B63B 27/26 244/110 E |
| 2005/0017129 A1 | 1/2005 | McDonnell |
| 2005/0132923 A1 | 6/2005 | Lloyd |
| 2005/0133665 A1 * | 6/2005 | Dennis ................. B64F 1/06 244/110 E |
| 2005/0151009 A1 * | 7/2005 | Roeseler ............... B64F 1/06 244/63 |
| 2005/0151014 A1 * | 7/2005 | McGeer ............... B64C 39/024 244/120 |
| 2005/0178894 A1 * | 8/2005 | McGeer ............... B64C 39/024 244/63 |
| 2005/0187677 A1 | 8/2005 | Walker |
| 2005/0204910 A1 | 9/2005 | Padan |
| 2005/0230536 A1 * | 10/2005 | Dennis ................. B64C 39/024 244/110 C |
| 2006/0006281 A1 | 1/2006 | Sirkis |
| 2006/0038067 A1 * | 2/2006 | Dennis ................. B64F 1/04 244/63 |
| 2006/0091258 A1 | 5/2006 | Chiu et al. |
| 2006/0102783 A1 * | 5/2006 | Dennis ................. B64F 1/222 244/110 F |
| 2006/0151667 A1 * | 7/2006 | Dennis ................. B64F 1/06 244/63 |
| 2006/0249623 A1 | 11/2006 | Steele |
| 2006/0271251 A1 | 11/2006 | Hopkins |
| 2007/0023582 A1 | 2/2007 | Steele et al. |
| 2007/0158498 A1 | 7/2007 | Snediker |
| 2007/0200027 A1 | 8/2007 | Johnson |
| 2007/0261542 A1 | 11/2007 | Chang et al. |
| 2008/0191091 A1 | 8/2008 | Hoisington et al. |
| 2009/0114761 A1 | 5/2009 | Sells, II |
| 2009/0191019 A1 | 7/2009 | Billings |
| 2009/0194638 A1 | 8/2009 | Dennis |

(56) References Cited

U.S. PATENT DOCUMENTS

| | | |
|---|---|---|
| 2009/0216394 A1 | 8/2009 | Heppe et al. |
| 2009/0218447 A1 | 9/2009 | von Flotow et al. |
| 2009/0224097 A1 | 9/2009 | Kariv |
| 2009/0236470 A1 | 9/2009 | Goossen et al. |
| 2009/0294584 A1 | 12/2009 | Lovell et al. |
| 2010/0017114 A1 | 1/2010 | Tehan et al. |
| 2010/0038477 A1 | 2/2010 | Kutzmann et al. |
| 2010/0181424 A1 | 7/2010 | Goossen et al. |
| 2010/0237183 A1 | 9/2010 | Wilson et al. |
| 2010/0243799 A1 | 9/2010 | Al-Qaffas |
| 2010/0286859 A1 | 11/2010 | Feigh et al. |
| 2010/0288872 A1* | 11/2010 | Wiley .................. B63B 35/44 244/33 |
| 2010/0318475 A1 | 12/2010 | Abrahamson |
| 2010/0326264 A1 | 12/2010 | Roemerman et al. |
| 2011/0001020 A1 | 1/2011 | Forgac |
| 2011/0311099 A1 | 12/2011 | Derbanne |
| 2012/0060674 A1 | 3/2012 | Garrison et al. |
| 2012/0061507 A1 | 3/2012 | Grabmeier et al. |
| 2012/0097795 A1 | 4/2012 | Zätterqvist |
| 2012/0104169 A1 | 5/2012 | von Flotow et al. |
| 2012/0150364 A1 | 6/2012 | Tillotson et al. |
| 2012/0210853 A1 | 8/2012 | Abershitz et al. |
| 2012/0223182 A1 | 9/2012 | Gilchrist, III et al. |
| 2012/0300070 A1 | 11/2012 | Ohtomo et al. |
| 2013/0076862 A1 | 3/2013 | Ohtomo et al. |
| 2013/0082137 A1 | 4/2013 | Gundlach et al. |
| 2013/0320138 A1* | 12/2013 | Dickson ................ B64F 1/029 244/110 F |
| 2014/0007804 A1* | 1/2014 | Gamache ............... B63B 21/48 114/311 |
| 2014/0048654 A1 | 2/2014 | Williamson et al. |
| 2014/0077034 A1 | 3/2014 | Woodland et al. |
| 2014/0119716 A1 | 5/2014 | Ohtomo et al. |
| 2014/0180914 A1 | 6/2014 | Abhyanker |
| 2014/0316616 A1 | 10/2014 | Kugelmass |
| 2015/0021436 A1 | 1/2015 | Hainsworth et al. |
| 2015/0041598 A1 | 2/2015 | Nugent et al. |
| 2015/0129716 A1 | 5/2015 | Yoffe |
| 2015/0158598 A1 | 6/2015 | You |
| 2015/0166177 A1* | 6/2015 | Bernhardt ............... B64D 1/12 258/1.2 |
| 2015/0239557 A1 | 8/2015 | Boros |
| 2015/0314871 A1 | 11/2015 | von Flotow |
| 2015/0360797 A1 | 12/2015 | Melish et al. |
| 2016/0009390 A1 | 1/2016 | Kugelmass |
| 2016/0035224 A1 | 2/2016 | Yang et al. |
| 2016/0114906 A1 | 4/2016 | McGeer et al. |
| 2016/0122018 A1 | 5/2016 | Matsue et al. |
| 2016/0137311 A1 | 5/2016 | Peverill et al. |
| 2016/0144980 A1 | 5/2016 | Kunz et al. |
| 2016/0152339 A1* | 6/2016 | von Flotow ............. B64C 27/04 244/2 |
| 2016/0207626 A1 | 7/2016 | Bailey |
| 2016/0227197 A1 | 8/2016 | Ohtomo et al. |
| 2016/0229533 A1 | 8/2016 | van Cruyningen |
| 2016/0251088 A1 | 9/2016 | Melish et al. |
| 2016/0264259 A1 | 9/2016 | Dickson et al. |
| 2016/0286135 A1 | 9/2016 | Baseuny |
| 2016/0306355 A1 | 10/2016 | Gordon et al. |
| 2016/0307449 A1 | 10/2016 | Gordon et al. |
| 2016/0327945 A1 | 11/2016 | Davidson |
| 2016/0336020 A1 | 11/2016 | Bradlow et al. |
| 2016/0344981 A1 | 11/2016 | Lunt |
| 2016/0355257 A1 | 12/2016 | Chappell |
| 2016/0375981 A1 | 12/2016 | McDonnell |
| 2016/0378109 A1 | 12/2016 | Raffa et al. |
| 2017/0158340 A1* | 6/2017 | von Flotow .......... B64C 39/024 |
| 2017/0158352 A1 | 6/2017 | von Flotow et al. |
| 2017/0225784 A1 | 8/2017 | Hayes et al. |
| 2017/0297712 A1 | 10/2017 | Kim et al. |
| 2017/0297738 A1 | 10/2017 | Von Flotow et al. |
| 2017/0369185 A1 | 12/2017 | Grubb |
| 2018/0162528 A1 | 6/2018 | McGrew et al. |
| 2021/0078725 A1* | 3/2021 | Dickson ................ B64C 39/024 |
| 2021/0347480 A1 | 11/2021 | Hayes et al. |

FOREIGN PATENT DOCUMENTS

| | | |
|---|---|---|
| DE | 19602703 | 2/1997 |
| EP | 0786403 | 7/1997 |
| EP | 0742366 | 9/1998 |
| EP | 1370461 | 12/2003 |
| EP | 2090946 | 8/2009 |
| FR | 854371 | 4/1940 |
| GB | 1445153 | 8/1976 |
| GB | 2080216 | 11/1979 |
| GB | 2093414 | 9/1982 |
| GB | 2150895 | 7/1985 |
| GB | 2219777 | 12/1989 |
| GB | 2231011 | 1/1990 |
| IL | 76726 | 1/1991 |
| JP | 07-304498 | 11/1995 |
| JP | 2008540217 | 11/2008 |
| JP | 2012-06587 | 1/2012 |
| JP | 2015085755 | 5/2015 |
| WO | 0075014 | 12/2000 |
| WO | 0107318 | 2/2001 |
| WO | 02076826 | 10/2002 |
| WO | 2008015663 | 2/2008 |
| WO | 201106640 | 6/2011 |
| WO | 2012047677 | 4/2012 |
| WO | 2014080386 | 5/2014 |
| WO | 2014203593 | 12/2014 |
| WO | 2016167849 | 10/2016 |

OTHER PUBLICATIONS

European Patent Office, "Communication pursuant to Article 94(3) EPC," issued in connection with European Patent Application No. 19186527.8, dated May 21, 2021, 7 pages.

Galinski et al., "Results of the Gust Resistant MAV Programme," 28$^{th}$ International Congress of the Aeronautical Sciences, 2012, 10 pages.

Phillips, "Alternate Aquila Recovery System Demonstraion Recovery System Flight Tests", Final Report, Jan. 19, 1977, 67 pages.

"Ames Builds Advanced Yawed-Wing RPV," Aviation Week and Space Technology, Jan. 22, 1973, 2 pages.

Dorr, "The XF-85 Goblin," DefenseMedia Network, retrieved from [http://www.defensemedianetwork.com/stories/the-xf-85-goblin-the-parasite-fighter-that-didnt- work/], Sep. 11, 2014, 5 pages.

Gross, Investigation of Lift, Drag, and Aerodynamic Pitching Moment During In-Flight Recovery of a Remotely Piloted Vehicle, Air Force Institute of Technology, NTIS, Sep. 1973, 99 pages.

Plane Talk, The Newsletter of the War Eagles Air Museum, www.war-eagles-air-museum.com; vol. 25, No. 1, First Quarter (Jan.-Mar. 2012), 8 pages.

Robinson, "Dynamic ; Analysis of a Carousel Remotely Piloted Vehicle Recovery System," 1977, Naval Post-Graduate School Master's Thesis, No. ADA052401, 70 pages.

Whitmore et al.,"Development of a Closed-Loop Strap Down Attitude System for an Ultrahigh Altitude Flight Experiment," Jan. 1997, NASA Technical Memorandum 4775, 31 pages.

State of Israel, The Patent Authority, "Notification of Deficiencies," issued in connection with Israeli Patent Application No. 248125, dated Nov. 29, 2018, 10 pages.

European Patent Office, "Extended European Search Report," issued in connection with European Patent Application No. 19186527.8, dated Dec. 12, 2019, 5 pages.

European Patent Office, "Extended European Search Report," issued in connection with European Patent Application No. 1619168034, dated Feb. 20, 2020, 8 pages.

IP Australia, "Examination report No. 1," issued in connection with Australian Patent Application No. 2016234931, dated May 14, 2020, 6 pages.

Canadian Intellectual Property Office, "Office Action," issued in connection with Canadian Patent Application No. 2,943,936, dated Jul. 31, 2019, 5 pages.

(56) References Cited

OTHER PUBLICATIONS

Canadian Intellectual Property Office, "Office Action," issued in connection with Canadian Patent Application No. 2,943,936, dated Apr. 27, 2020, 3 pages.
China National Intellectual Property Administration, "Notification of First Office Action," issued in connection with Chinese Patent Application No. 2016108605105, dated Nov. 27, 2020, 12 pages.
Japanese Patent Office, "Notice of Reasons for Rejection," issued in connection with Japanese Patent Application No. 2016-191800, dated Jun. 9, 2020, 9 pages.
United States Patent and Trademark Office, "Requirement for Restriction and/or Election," issued in connection with U.S. Appl. No. 15/269,597, dated Jun. 18, 2019, 11 pages.
United States Patent and Trademark Office, "Non-Final Office Action," issued in connection with U.S. Appl. No. 15/269,597, dated Jan. 9, 2020, 13 pages.
United States Patent and Trademark Office, "Final Office Action," issued in connection with U.S. Appl. No. 15/269,597, dated Aug. 18, 2020, 13 pages.
United States Patent and Trademark Office, "Advisory Action," issued in connection with U.S. Appl. No. 15/269,597, dated Sep. 22, 2020, 4 pages.
United States Patent and Trademark Office, "Notice of Allowance and Fee(s) Due," issued in connection with U.S. Appl. No. 15/269,597, dated Oct. 2, 2020, 8 pages.
Japanese Patent Office, "Decision of Rejection," issued in connection with Japanese Patent Application No. 2021-003855, dated Apr. 19, 2022, 5 pages. (English version provided).
Canadian Intellectual Property Office, "Office Action," issued in connection with Canadian Patent Application No. 2,943,936, dated Feb. 23, 2021, 3 pages.
Japan Patent Office, "Notice of Reasons for Rejection," issued in connection with Japanese Patent Application No. 2021-003855, dated Jan. 4, 2022, 6 pages.
Canadian Intellectual Property Office, "Office Action," issued in connection with Canadian Patent Application No. 3,119,398, dated Aug. 30, 2022, 3 pages.
Canadian Intellectual Property Office, "2nd Office Action," issued in connection with Canadian Patent Application No. 3,119,398, dated Feb. 8, 2023, 5 pages.
The Korean Intellectual Property Office, "Notice of Office Action," issued in connection with Korean Patent Application No. 10-216-0125254, dated Feb. 1, 2023, 14 pages.
United States Patent and Trademark Office, "Non-Final Office Action," issued in connection with U.S. Appl. No. 17/133,068, filed Mar. 22, 2023, 15 pages.
Dickard, "Mini-RPV Recovery System Conceptual Study," Aug. 1977, U.S. Army Study, Contract DA4J02-76-C-0048, Report No. USAAMRDL-TR077-24, 159 pages.
Hunton et al., NACA Research Memorandum for the Air Material Command, U.S. Air Force, "An Investigation of the McDonnell XP-85 Airplane in the Ames 40 by 80 Foot Wind Tunnel—Force and Moment Tests," National Advisory Committee for Aeronautics, Sep. 27, 1948, 155 pages. (Uploaded in two parts).

\* cited by examiner

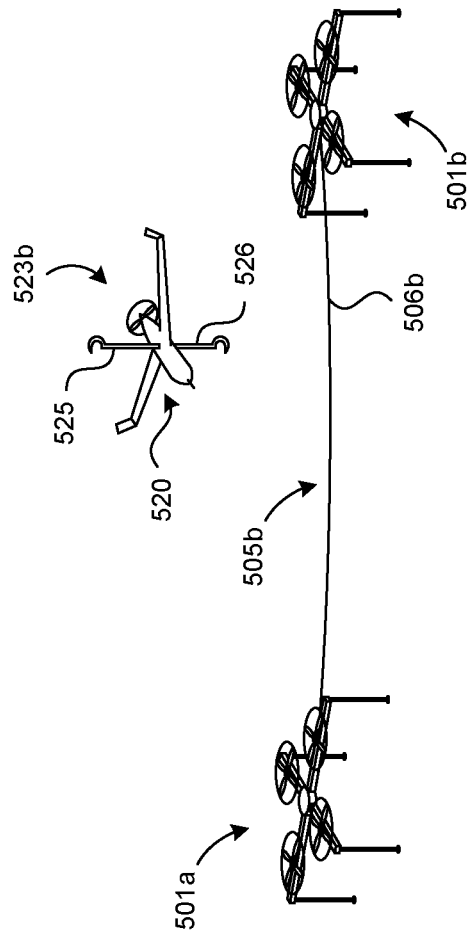
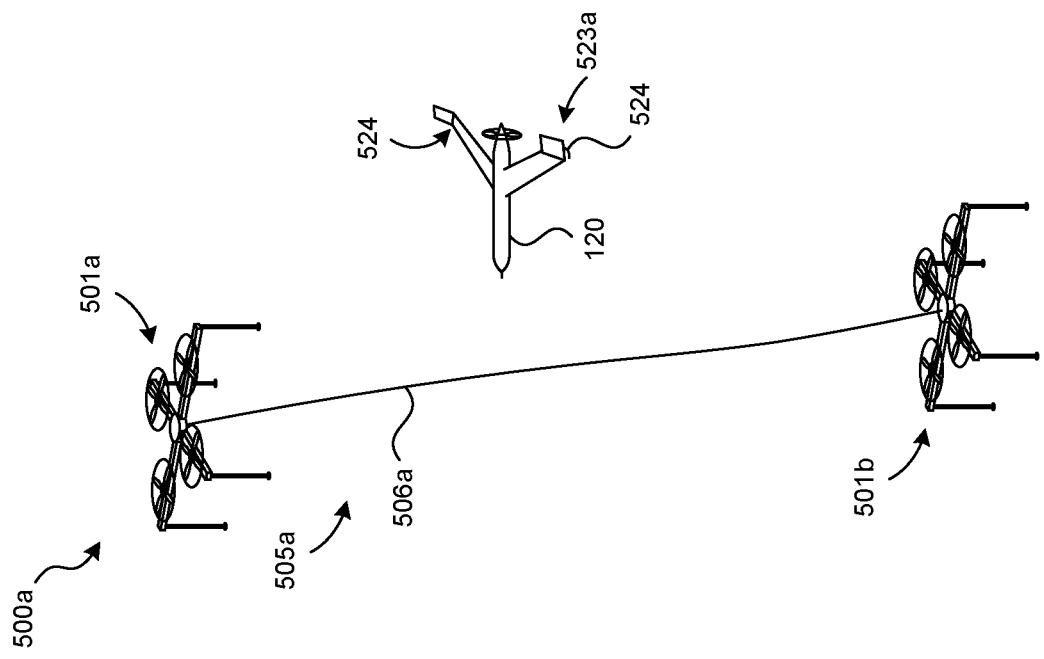
FIG. 5B
FIG. 5A

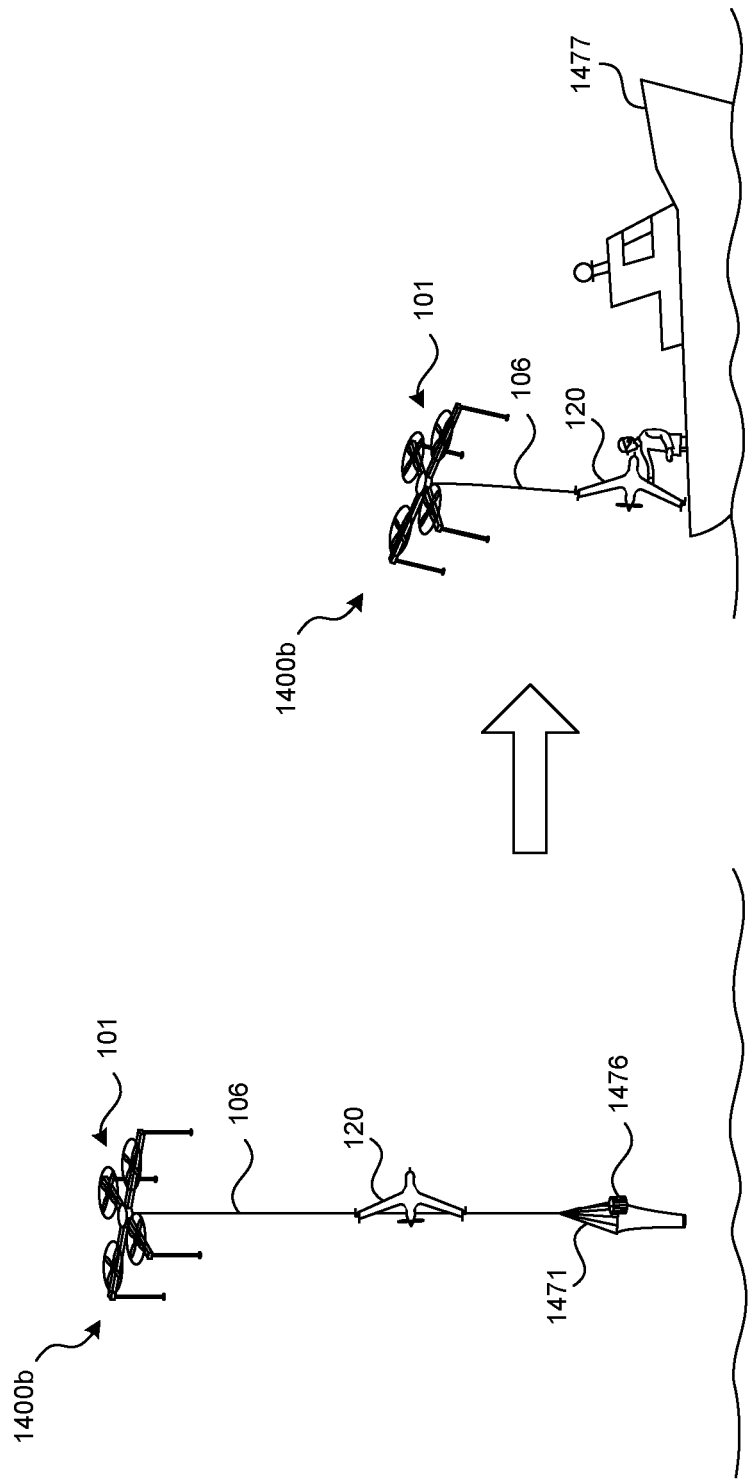

AERIAL LAUNCH AND/OR RECOVERY FOR UNMANNED AIRCRAFT WITH SUBMERSIBLE DEVICES, AND ASSOCIATED SYSTEMS AND METHODS

CROSS-REFERENCE TO RELATED APPLICATIONS

This application arises from a division of U.S. patent application Ser. No. 15/269,597, filed Sep. 19, 2016, which claims priority to U.S. Provisional Patent Application No. 62/236,824, filed Oct. 2, 2015, and U.S. Provisional Patent Application No. 62/311,773, filed Mar. 22, 2016. The entireties of U.S. patent application Ser. No. 15/269,597, U.S. Provisional Patent Application No. 62/236,824, and U.S. Provisional Patent Application No. 62/311,773 are hereby incorporated by reference herein.

TECHNICAL FIELD

The present technology is directed generally to aerial launch and/or recovery for unmanned aircraft, and associated systems and methods.

BACKGROUND

Aircraft require varying degrees of support equipment and systems for launch and recovery. Conventionally, aircraft take off from and land on runways, usually located at airports that provide parking, fuel, hangars, air and ground traffic control, maintenance services, and terminals for passengers, baggage, and freight. Unmanned aircraft, including drones, unmanned aerial vehicles (UAVs), unmanned aircraft systems (UAS) and robotic aircraft, present unique challenges and opportunities for mechanisms and methods that enable the safe initiation of flight (takeoff or launch) and safe capture, recovery, and return of the aircraft. For example, some existing unmanned aircraft are launched using catapults, and captured using wing-mounted hooks that engage with a suspended capture line.

While the foregoing techniques, particularly techniques including catapult launch and suspended-line capture, have proven successful, there remains a need for systems with improved size, weight, and cost characteristics.

BRIEF DESCRIPTION OF THE DRAWINGS

Unless otherwise noted, the Figures may not be drawn to scale, for purposes of illustration and/or clarity.

FIG. 5A is a partially schematic illustration of multiple first aircraft operating to position a capture line in a generally vertical orientation for capturing a second aircraft, in accordance with an embodiment of the present technology.

FIG. 5B is a partially schematic illustration of multiple first aircraft operating to position a capture line in a generally horizontal orientation for capturing a second aircraft, in accordance with another embodiment of the present technology.

FIGS. 14B-14D are a partially schematic illustrations of a first aircraft configured to operate in a marine environment, in accordance with another embodiment of the present technology.

DETAILED DESCRIPTION

The present disclosure describes systems and methods for launching and/or recovering aircraft, in particular, unmanned aircraft. Many specific details of certain embodiments of the disclosure are set forth in the following description and FIGS. 1-14D to provide a thorough understanding of these embodiments. Well-known structures, systems, and methods that are often associated with such embodiments, but that may unnecessarily obscure some significant aspects of the disclosure, are not set forth in the following description for purposes of clarity. Moreover, although the following disclosure sets forth several embodiments of the technology, several other embodiments of the technology can have different configurations and/or different components than those described in this section. As such, the technology may include other embodiments with additional elements, and/or without several of the elements described below with reference to FIGS. 1-14D.

Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

Figure 1:
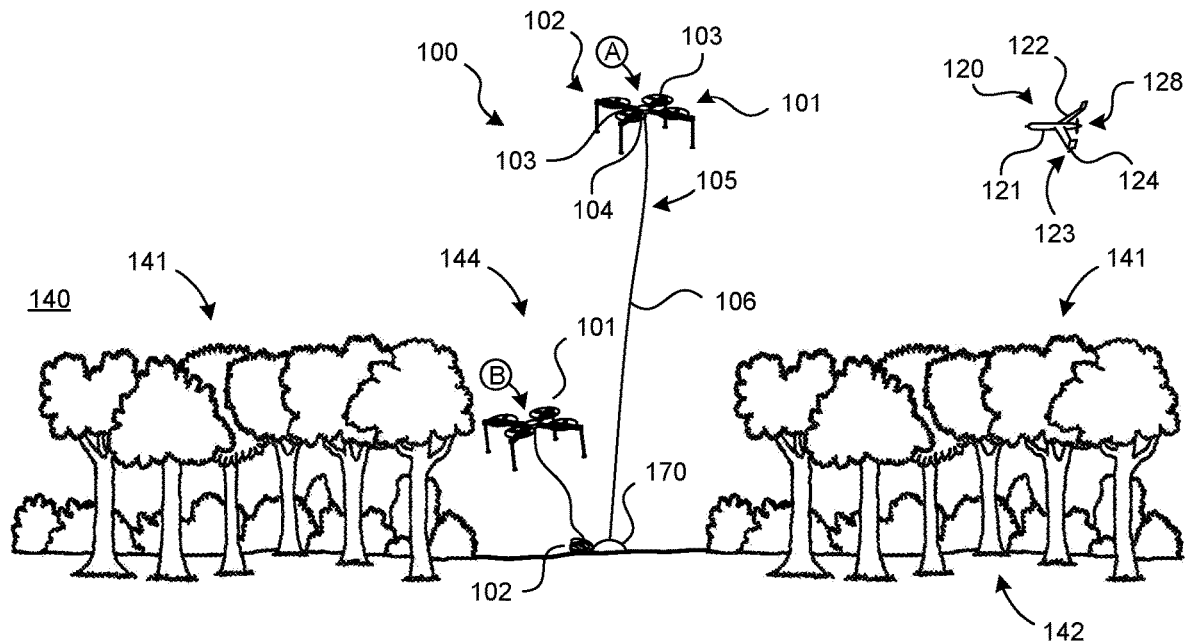
FIG. 1 is partially schematic illustration of a system that includes a first aircraft configured to capture a second aircraft, in accordance with an embodiment of the present technology.

FIG. 1 is a partially schematic illustration of a system 100 that includes a first aircraft 101 and a second aircraft 120. The first aircraft 101 can be configured to launch, capture, or both launch and capture the second aircraft 120. Accordingly, the first aircraft 101 may be referred to herein as a carrier or support aircraft, and the second aircraft 120 may be referred to herein as a carried or target aircraft. The carrier aircraft can conduct a carrying function before launch and/or after capture, and the carried aircraft can be carried before launch and/or after capture. In particular embodiments, the system 100 can be configured to operate in an environment 140 having obstructions 141 that make conventional techniques for launching and/or capturing the second aircraft 120 difficult. Further details of representative first aircraft 101, second aircraft 120, and the environments in which they operate are described below.

With continued reference to FIG. 1, the first aircraft 101 can be configured for vertical takeoff and landing (VTOL), and hover, to allow for operation in constrained areas. Accordingly, the first aircraft 101 can include an airframe 102 and multiple rotors 103 (e.g., in a quad-rotor configuration) powered by an on-board power source 104. The first aircraft 101 can include a first capture device 105, for example, a flexible capture line 106 that hangs down from the first aircraft 101 in a position suitable for engaging with the second aircraft 120 during a capture operation.

Figure 2:
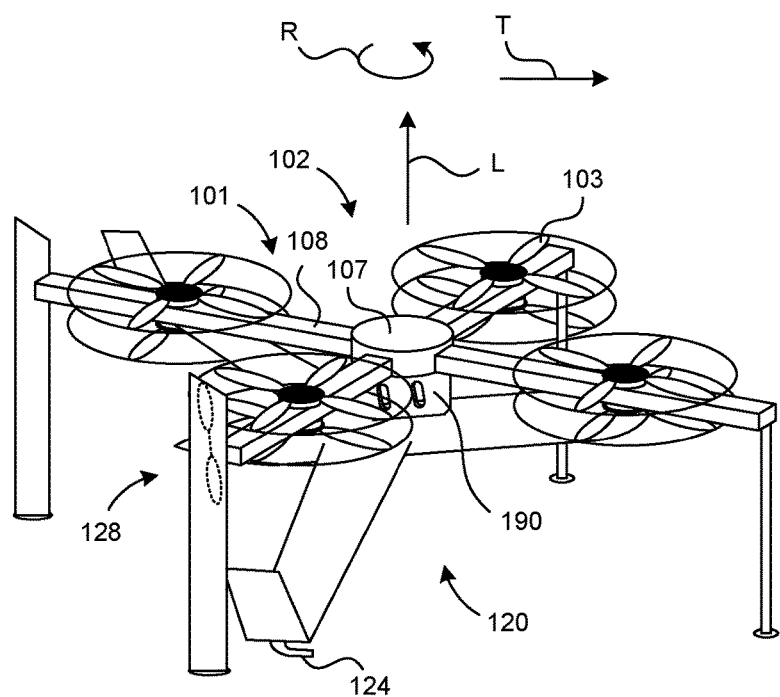
FIG. 2 is a partially schematic illustration of a representative first aircraft carrying a second aircraft.

In a particular embodiment, the second aircraft 120 can have a fixed-wing configuration, with a fuselage 121 carried by fixed wings 122. The second aircraft 120 is propelled by a propulsion system 128, e.g., an on-board propulsion system. The propulsion system 128 can include one or more pusher propellers (one is shown in FIG. 2) or tractor propellers, powered by an internal combustion engine, electric motor, battery, and/or other suitable device. The second aircraft 120 can include a second capture device 123 positioned to engage with the first capture device 105 carried by the first aircraft 101. In particular embodiments, the second capture device 123 includes one or more wing tip hooks 124. When one of the wings 122 strikes the capture line 106, the corresponding wing tip hook or hooks 124 releasably engage with the capture line 106, causing the captured second aircraft 120 to dangle from the capture line 106. The first aircraft 101 then guides the capture line 106 and the captured second aircraft 120 in a controlled descent to the ground. Further details of representative capture devices and techniques are described in U.S. Pat. Nos. 6,264,140 and 7,059,564, both assigned to the assignee of the present application, and both incorporated herein by reference.

In an embodiment shown in FIG. 1, the system 100 includes a downline apparatus 170 to which the capture line 106 is attached. The downline apparatus 170 can include an anchor and/or shock absorbing elements that cushion the impact of the second aircraft 120 with the capture line 106.

In operation, the first aircraft 101 flies upwardly (e.g., vertically upwardly) to a position above the local obstructions 141 and a height sufficient to facilitate capturing the second aircraft 120. As shown in FIG. 1, the obstructions 141 can include trees 142 (e.g., in a forest or jungle), and the first aircraft 101 can ascend through a relatively small opening or clearing 144 in the trees 142. The power source 104, which provides power to the rotors 103 of the first aircraft 101, can include an internal combustion engine, a battery, and/or another suitable device that is carried aloft with the first aircraft 101. In other embodiments described later, the first aircraft 101 can receive power from a ground-based source. In any of these embodiments, the first aircraft 101 rises to a position indicated by letter A to capture the second aircraft 120, and then descends, as indicated by letter B once the second aircraft 120 has been captured. Near the ground, the first aircraft can lower the second aircraft 120 to the ground, autonomously, or under control of a pilot, with or without the assistance of a human operator on the ground to manually handle the aircraft as it descends the last few feet.

A representative power source 104 for the first aircraft 101 includes a rechargeable battery. An advantage of the rechargeable battery, when compared to other power sources such as an internal combustion engine, is that the battery can eliminate the need for an on-board fuel source (e.g., gasoline, aviation fuel, and/or another fuel) while still providing sufficient short-term power for a launch operation and/or a recovery operation.

In particular embodiments, the first aircraft 101 can be configured not only to capture the second aircraft 120, but also to launch the second aircraft 120 from an aerial position. FIG. 2 schematically illustrates the general features of such an arrangement. As shown in FIG. 2, the first aircraft 101 can include a central portion 107 (e.g., a fuselage), and multiple arms 108. The propulsion system 128 can include multiple rotors 103 carried by the corresponding arms 108. The first aircraft 101 can also include a launch fixture 190 positioned to securely hold the second aircraft 120 during an ascent maneuver. The launch fixture 190 is configured to release the second aircraft 120 once aloft (e.g., upon command), and permit the first aircraft 101 to land without the second aircraft 120 attached. In a particular embodiment, the second aircraft 120 can include a ScanEagle® UAV, manufactured by Insitu, a subsidiary of The Boeing Company, and in other embodiments, can include other vehicles.

In operation, the first aircraft 101 lifts the second aircraft 120 as indicated by arrow L, rotates to a suitable orientation as indicated by arrow R and translates to a suitable launch location as indicated by arrow T. Optionally, the first aircraft 101 can rotate again at the launch location, e.g., to position the second aircraft 120 facing into the wind for launch. The propulsion system 128 of the second aircraft 120 can be started either before the second aircraft 120 has been lifted, or after the second aircraft 120 is aloft. Once at the launch location, the first aircraft 101 releases the second aircraft 120 for flight, as will be described in further detail later with reference to FIGS. 11-12. In some embodiments, the second aircraft 120 is released at a high enough elevation (and has a suitably high glide slope) that it drops, gains air speed, and then levels off. In other embodiments, the first aircraft 101 has sufficient forward velocity at launch to reduce or eliminate any drop in elevation by the second aircraft 120 as the second aircraft 120 is released.

Figure 3:
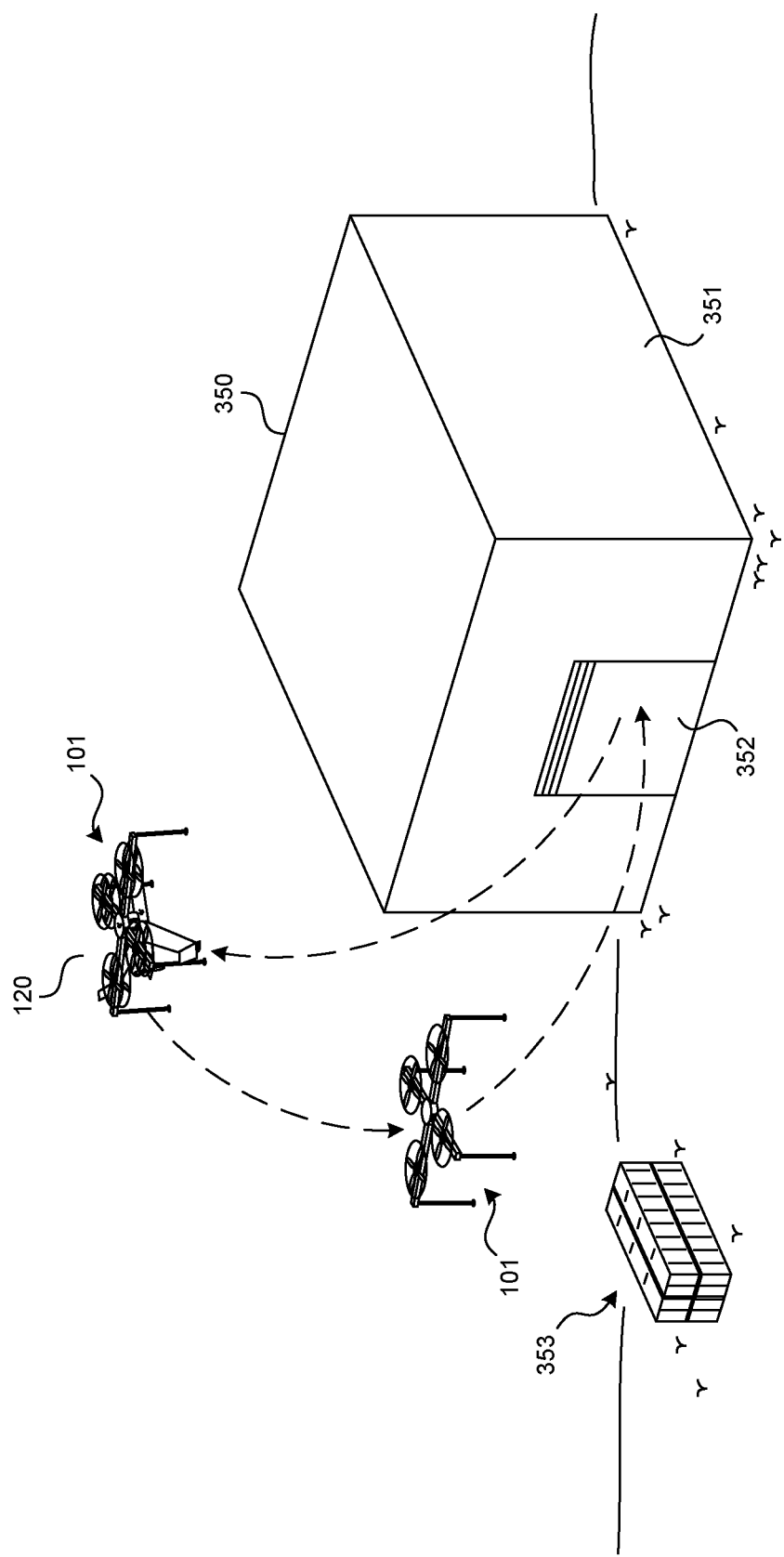
FIG. 3 is a partially schematic illustration of a process for deploying a first aircraft, launching a second aircraft carried by the first aircraft, and landing the first aircraft, in accordance with an embodiment of the present technology.

FIG. 3 is a partially schematic illustration of a representative first aircraft 101 operating from an enclosed space 350. The enclosed space 350 can include a building 351 having a restricted opening 352 through which the first aircraft 101 exits in preparation for a launch operation, and returns after the launch operation is complete. After returning, the same or a different first aircraft 101 can be prepared for a capture operation, e.g., by charging (or re-charging) on-board batteries or other power sources, and connecting to a capture line. The first aircraft 101 can then re-deploy from the enclosed space 350 to conduct a capture operation and again return to the enclosed space 350. The enclosed space 350 can enhance the "stealth" characteristics of the overall operation by obscuring the ability of others to observe the launch and recovery operations. In other embodiments, the enclosed space 350 can provide a sheltered area for operations, maintenance, refueling, recharging, inspections, reconfigurations, and/or other suitable elements of flight operations. The enclosed space 350 can include a temporary structure, a permanent structure, a natural protected volume with a restricted opening (e.g., a cave or overhang), and/or a natural space beneath a forest or jungle canopy (which can optionally be cleared and shaped for suitable operation). The enclosed space 350 can include soft and/or hard materials, for example, cloth, metal, concrete, wood, suitable fasteners and adhesives, and/or other suitable materials.

The first aircraft 101, second aircraft 120, and associated hardware and systems can be housed in one or more shipping containers 353 for transport to and from operational locations. The shipping containers 353 can also be housed in the enclosed space 350. To date, forward operations are provisioned at arbitrary times in the typical timeline of a forward operation, without the option to selectively pick and procure arbitrary lists of individual parts required for successful, smooth conduct of operations. Such operations can include surveillance and sensing using daylight and infrared cameras attached to the second aircraft 120. The shipping containers 353 can include standard boxes, for example, molded containers designed for modular (e.g., foldable or easily disassemble) unmanned aircraft, that can be provisioned with arbitrary selected combinations of components. Accordingly, the component set for a given mission can be standardized, which improves the efficiency with which the mission is supported and carried out.

Figure 4A:
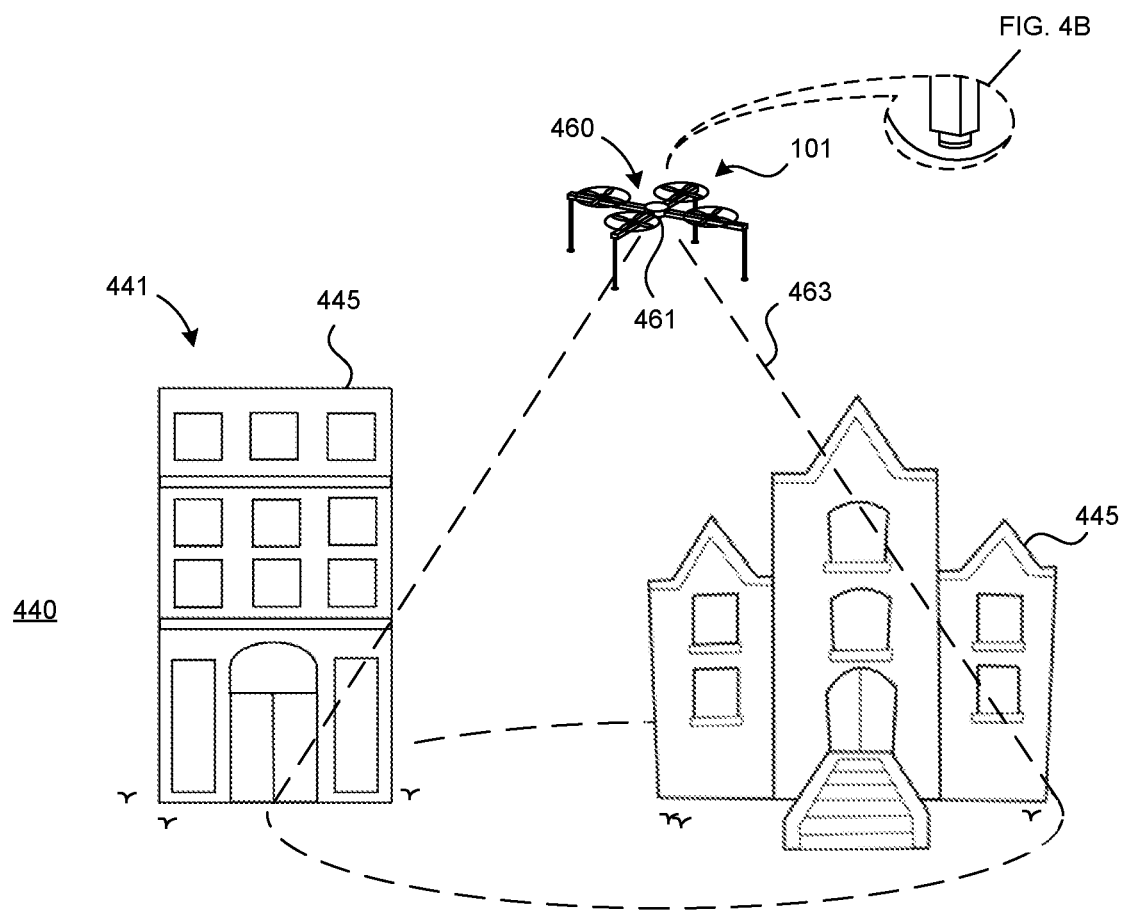
FIG. 4A is a partially schematic illustration of a first aircraft operating in an urban environment with obstructions that include buildings, in accordance with an embodiment of the present technology.
Figure 4B:
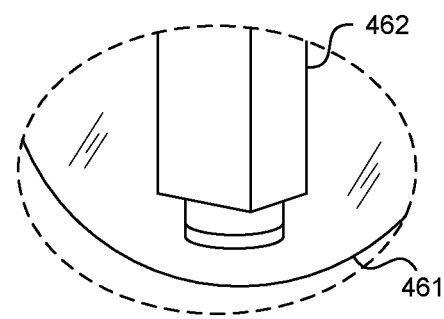
FIG. 4B is an enlarged illustration of a sensing pod and camera carried by the first aircraft shown in FIG. 4A.
Figure 6:
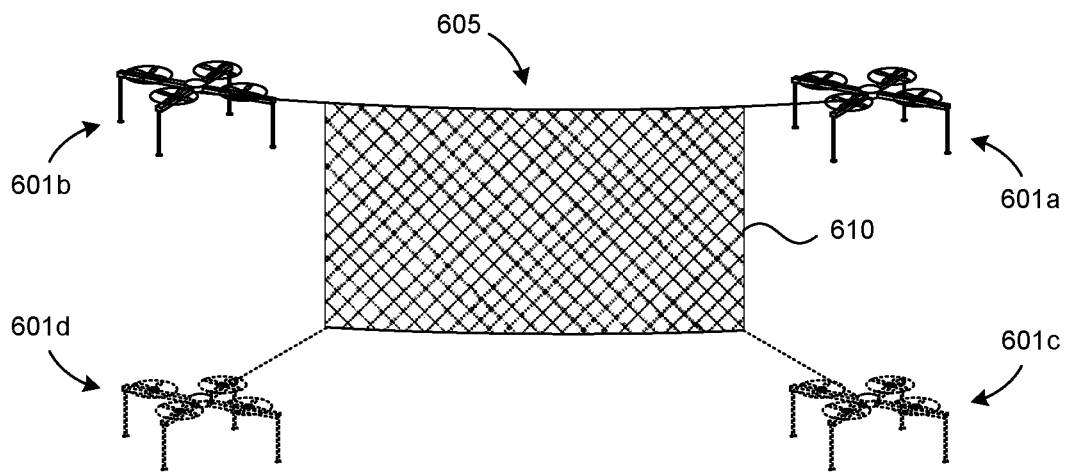
FIG. 6 is a partially schematic illustration of multiple first aircraft operating to support a net for capturing a second aircraft, in accordance with another embodiment of the present technology.

FIG. 4A is a partially schematic illustration of a representative first aircraft 101 operating in an urban environment 440 that includes obstructions 441 in the form of buildings 445 and/or other typically urban structures. The first aircraft 101 can operate in a manner generally similar to that described above with reference to FIGS. 1-3 and, in a particular embodiment, can include one or more sensors 460 to aid in navigation during launch and/or capture operations. The sensor 460 can be housed in a sensing pod 461, a portion of which is shown in greater detail in FIG. 4B. As shown in FIG. 4B, the sensor 460 can include a camera 462, and the sensing pod 461 can be formed from a transparent material that protects the camera 462, while allowing the camera 462 suitable access to the environment 440. The camera 462 can operate at visible wavelengths, infrared wavelengths, and/or other suitable wavelengths, depending upon the particular mission carried out by the first aircraft 101. The sensing pod 461 can be carried by the first aircraft 101 in a position that allows for a significant field of view 463 (shown in FIG. 4A). The camera 462 can be used to perform any one or combination of functions associated with launching and capturing the second aircraft. For example, the camera 462 can be used to avoid obstacles as the first aircraft 101 ascends and descends during launch and/or recovery operations. During recovery operations, the camera 462 can also be used to gently lower the captured aircraft to the ground without damaging it.

As discussed above with reference to FIG. 1, the system 100 can include a downline apparatus 170 that secures the capture line 106 to the ground during capture operations. In at least some embodiments, it may not be feasible or practical to secure the capture line to the ground during capture operations. In such cases, the system can be configured to suspend the capture line between multiple first aircraft to provide suitable tension in the line, without relying on a ground-based anchor. For example, referring to FIG. 5A, a representative system 500a can include two first or support aircraft 501a, 501b carrying a first capture device 505a between them. In this embodiment, the first capture device 505a includes a generally vertical capture line 506a, e.g., a capture line that is more vertical than horizontal. The two first aircraft 501a, 501b can be positioned one above the other to align the capture line 506a in a generally vertical orientation. A second aircraft 120, e.g., having a configuration generally similar to that described above with reference to FIG. 1, can include a corresponding second capture device 523a that includes wing-tip hooks 524 positioned to engage the capture line 506a. The two first aircraft 501a, 501b can fly cooperatively to provide the proper tension in the capture line 506a, and to safely bring the second aircraft 120 to the ground after capture. In particular embodiments, the coordinated operation of the two first aircraft 501a, 501b can be autonomous, or partially autonomous, with the first aircraft 501a, 501b communicating directly with each other to perform the capture and landing operation. In still a further aspect of this embodiment, a manual override instruction issued by the operator (e.g., seizing manual control) will be applied to both the first aircraft 501a, 501b.

FIG. 5B illustrates an arrangement similar to that shown in FIG. 5A, but with the two first or support aircraft 501a, 501b carrying a first capture device 505b that includes a capture line 506b positioned in a generally horizontal rather than vertical orientation (e.g., with the capture line 506b more horizontal than vertical). This orientation can be suitable for capturing a second aircraft having a different second capture device. For example, as shown in FIG. 5B, a representative second aircraft 520 can include a second capture device 523b that in turn includes an upper hook 525 and a lower hook 526. The hooks 525, 526 can be stowed during normal flight and then deployed prior to capture. In particular embodiments, only one of the hooks 525, 526 is deployed, depending upon the position of the second aircraft 520 relative to the capture line 506b. In other embodiments, both hooks 525, 526 can be deployed to provide greater assurance of a successful capture, regardless of whether the second aircraft 520 passes above or below the capture line 506b during the capture operation.

In still further embodiments, multiple first aircraft can carry and deploy capture devices having configurations other than a suspended capture line. For example, referring now to FIG. 6, two first aircraft 601a, 601b are configured to carry a capture device 605 between them, with the capture device 605 including a net 610. The net 610 can be used to capture aircraft that may not have the specific capture devices described above with reference to FIGS. 5A-5B (e.g., wing-tip hooks and/or upper and lower hooks). In one aspect of this embodiment, the net 610 may have weights at or near the lower edge to keep the net 610 properly oriented. In another embodiment, two additional first aircraft 601c, 601d (shown in dashed lines) are used to provide support and positioning for the lower corners of the net 610. In particular embodiments, the second aircraft (not shown in FIG. 6) captured via the net 610 can be specifically configured for such capture operations. For example, the second aircraft can have fewer and/or particularly robust projections that withstand the forces that may be encountered as the second aircraft engages with the net 610. In other embodiments, the second aircraft and/or the techniques used to capture the second aircraft with the net 610 can be configured to avoid the need for such specific designs. For example, the first aircraft 601a, 601b carrying the net 610 can fly the net in the same direction as the incoming second aircraft to reduce the forces imparted to the second aircraft as it engages with the net 610.

One aspect of an embodiment of the system described above with reference to FIG. 1 is that the power source for the first aircraft (e.g., a battery-powered motor, or an internal combustion engine) is carried on-board the first aircraft. In other embodiments, power can be supplied to the first aircraft from a ground-based source. For example, referring now to FIG. 7, a representative first aircraft 701a can receive power from a ground-based power source 730, via a power transmission link 731. In a particular aspect of this embodiment, the power transmission link 731 can include a power cable 732a that transmits electrical power to a power receiver 713 carried by the first aircraft 701a. The power receiver 713 can include a connector 711, for example, a quick-release electrical connector, which is coupled to one or more on-board electrical motors to drive corresponding rotors 703 of the first aircraft 701a. The first aircraft 701a can carry a capture line 706 for capturing a suitably-equipped second aircraft 120a (FIG. 5A).

Figure 7:
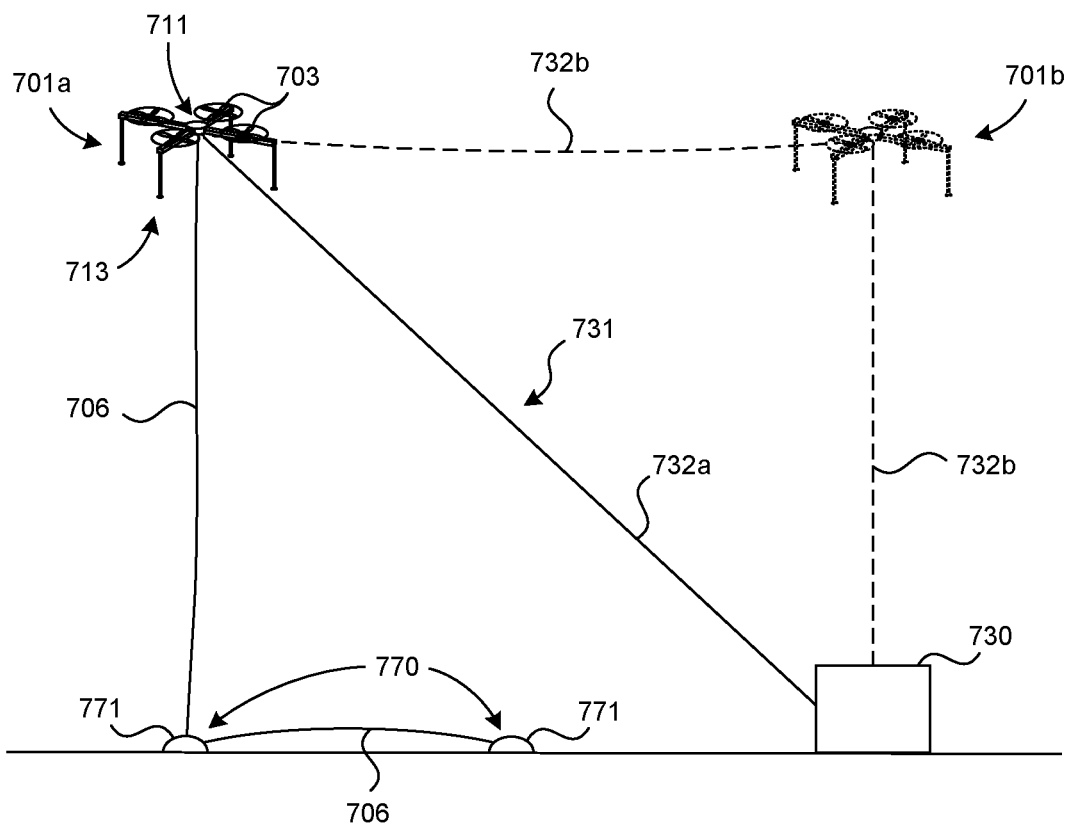
FIG. 7 is a partially schematic illustration of a first aircraft that receives power from a ground-based power source, alone or in combination with another aircraft, in accordance with embodiments of the present technology.
Figure 8:
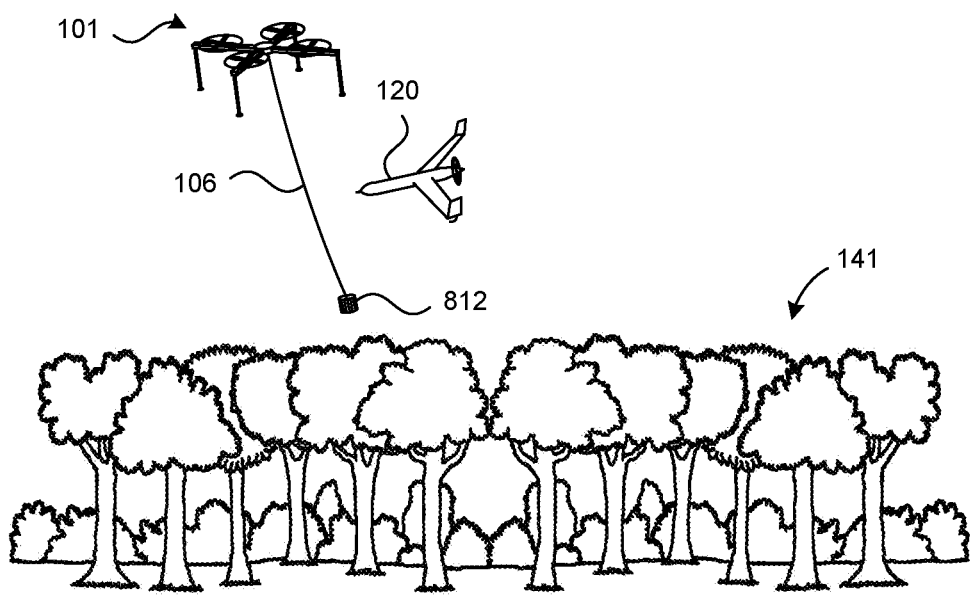
FIG. 8 is a partially schematic illustration of a first aircraft positioned above obstructions to capture a second aircraft, in accordance with embodiments of the present technology.

In another aspect of an embodiment shown in FIG. 7, the system can include multiple first aircraft shown as two first aircraft 701a, 701b, e.g., to position the power transmission link 731 in a way that reduces or eliminates interference with the capture line 706. For example, one first aircraft 701a (shown in solid lines) can carry the capture line 706 and the power receiver 713, and another first aircraft 701b (shown in dotted lines) can carry a corresponding power cable 732b (also shown in dotted lines) in a position that is offset away from the capture line 706. Accordingly, one of the first aircraft can perform the capture operation (and optionally a launch operation) and the other can provide a support function. The first aircraft 701b performing the support function can have the same configuration as the first aircraft 701a performing the capture function, or the two aircraft can have different configurations. For example, the first aircraft 701b performing the support function can have a greater or lesser load capacity, depending on whether the loads associated with the power-cable carrying function are greater or less than the loads associated with the capture function. The corresponding power cable 732b can include multiple segments, for example, one segment between the ground-based power source 730 and the first aircraft 701b, and another between the two first aircraft 701a, 701b.

Whether or not multiple first aircraft 701 are employed in the arrangement shown in FIG. 7, the capture line 706 can be attached to a downline apparatus 770 that includes one or more anchors 771. The anchor(s) 771 can perform different functions. For example, one anchor can redirect the path of the capture line 706 to another anchor, which includes shock absorbing features to cushion the impact of a second aircraft 120 (FIG. 5A) striking the capture line 706 during a capture operation.

As discussed above, the capture line 706 can be tensioned via a ground-based downline apparatus, or by another aircraft. In still another embodiment, shown in FIG. 8, a representative first aircraft 101 can carry a capture line 106 that is tensioned by a hanging mass 812, e.g., attached to the capture line 106 at or near its free end. This arrangement can allow the first aircraft 101 to perform a capture operation while positioned completely above any nearby obstructions 141, without the need for access to the ground (or another first aircraft) to provide tension in the capture line 106.

Figure 9:
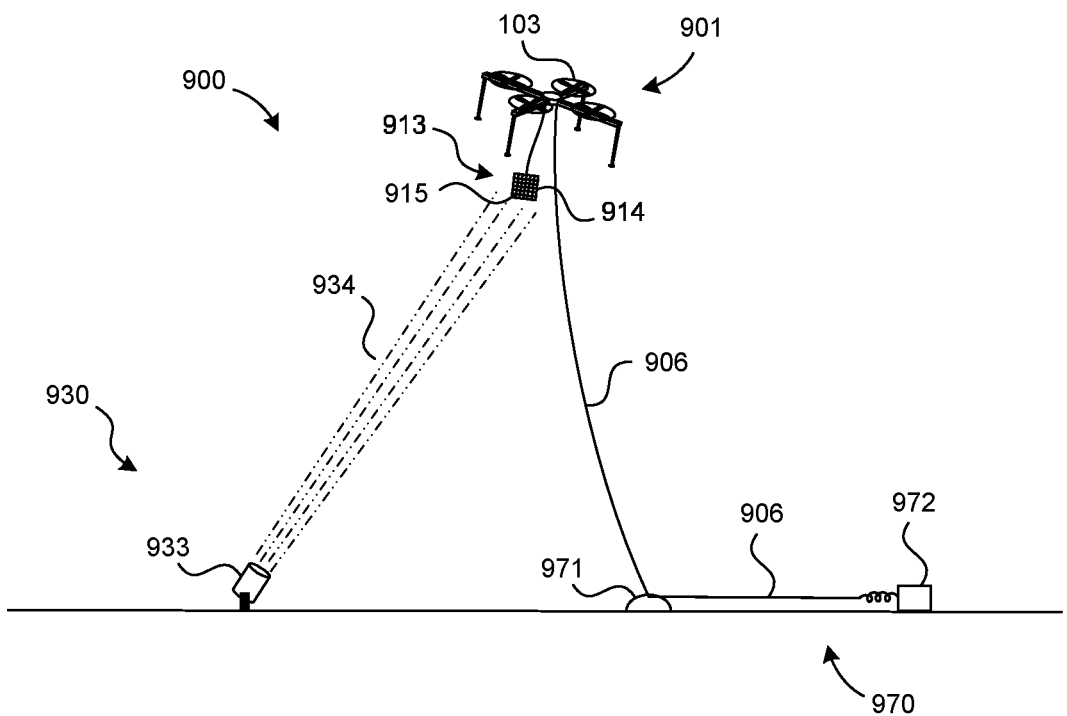
FIG. 9 is a partially schematic illustration of a first aircraft that receives power from a ground-based power source via a wireless link, in accordance with another embodiment of the present technology.

FIG. 9 is a partially schematic illustration of a system 900 that includes a first aircraft 901 configured to receive power from a ground-based source 930 via a wireless link. In a particular aspect of this embodiment, the ground-based power source 930 includes a radiation source 933, e.g., a source of illumination or other electromagnetic radiation 934. The first aircraft 901 can include a power receiver 913 that in turn includes one or more wireless receiver elements 914 positioned to receive energy from the ground-based power source 930. For example, the power receiver 913 can include one or more photovoltaic cells 915 that receive the radiation 934, convert the radiation to electrical current, and provide the electrical current to motors that drive the rotors 103 or other propulsion system components.

The first aircraft 901 is shown carrying a capture line 906 that is connected to a downline apparatus 970. The downline apparatus 970 can include an anchor 971 (e.g., a pulley) and a tension device 972 (e.g., an elastic, spring-bearing, and/or other shock absorbing device) for handling and/or controlling the motion of the capture line 906 and the captured second aircraft (not shown in FIG. 9).

One feature of embodiments of the system described above with reference to FIG. 9 is that the wireless system for transmitting energy from the ground to the first aircraft can simplify the flight operations of the first aircraft, for example, by reducing limitations imposed by the power transmission line 731 discussed above with reference to FIG. 7. Conversely, using a wired or direct power transmission link of the type described above with reference to FIG. 7 can provide energy more efficiently than a wireless link and the energy conversion processes associated therewith.

Figure 10:
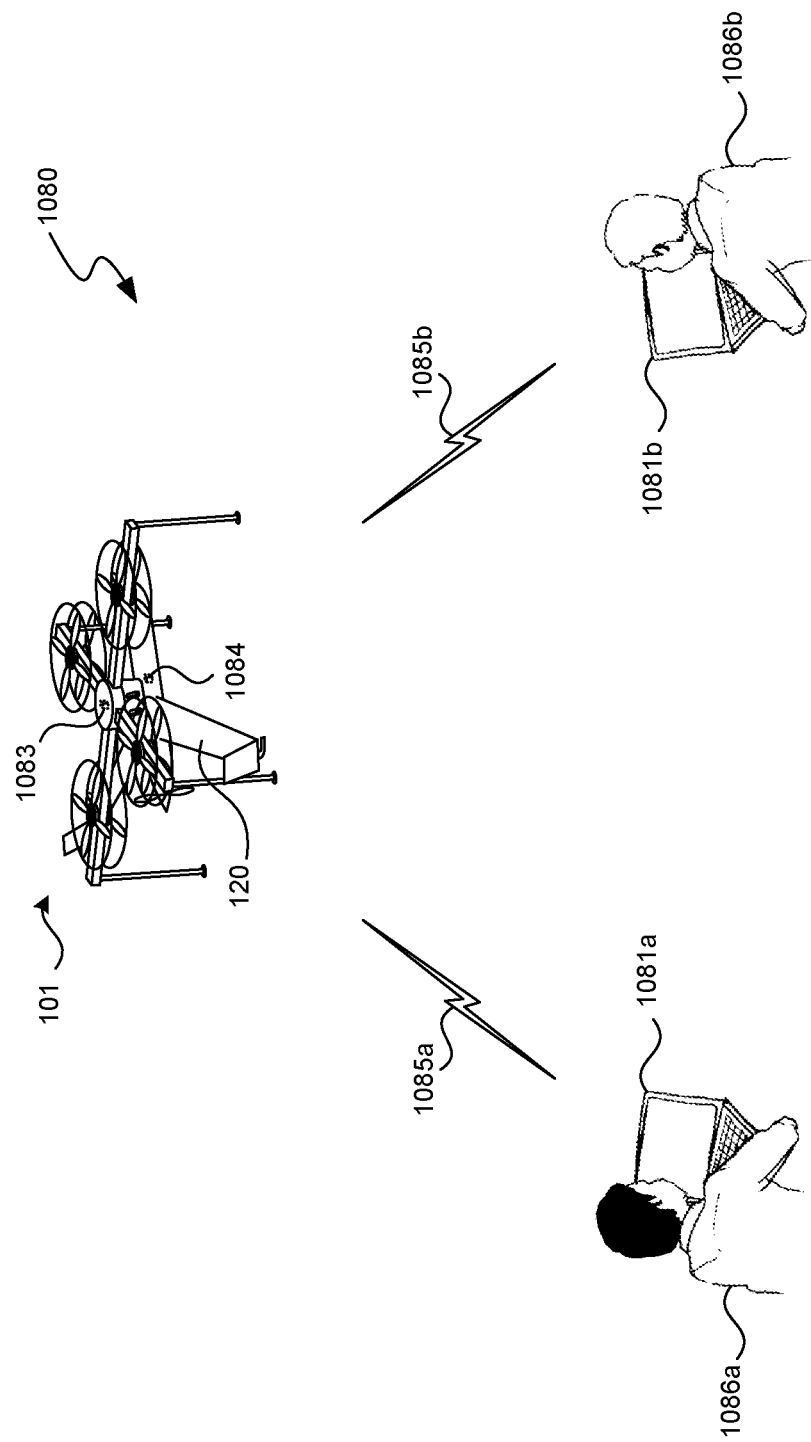
FIG. 10 illustrates controllers configured to control first and/or second aircraft, in accordance with embodiments of the present technology.

Referring now to FIG. 10, in any of the embodiments described above, the systems include one or more controllers 1080 to monitor and direct the operations of the various aircraft. For example, the first aircraft 101 can include a first on-board controller 1083, and the second aircraft 120 can include a second on-board controller 1084. Each of these controllers directs the movement of the respective aircraft via signals directed to the propulsion systems, moveable aerodynamic surfaces, and/or other aircraft components. In some embodiments, the operation of the first and second aircraft 101, 120 can be completely autonomous, with each aircraft pre-programmed before operation. In other embodiments, both aircraft are controlled via a single ground-based controller, and in still a further particular embodiment, each aircraft is controlled by a separate controller. Accordingly, the overall controller 1080 can include a first off-board controller 1081a (e.g., a first ground station) operated by a first operator 1086a and in communication with the first aircraft 101 via a first communication link 1085a. The controller 1080 can further include a second off-board controller 1081b (e.g., a second ground station), operated by a second operator 1086b, and in communication with second aircraft 120 via a second communication link 1085b. The first and second operators 1086a, 1086b can communicate with each other, e.g., orally by being co-located next to or near each other, or via phone, two-way radio, or any other suitable longer range communication device. The off-board controllers can perform any of a wide variety of diagnostic and informational tasks, in addition to providing control instructions to the first and second aircraft. For example, the controllers can provide an automated or partially automated checklist and countdown procedure for an aircraft launch and/or recovery.

Figure 11:
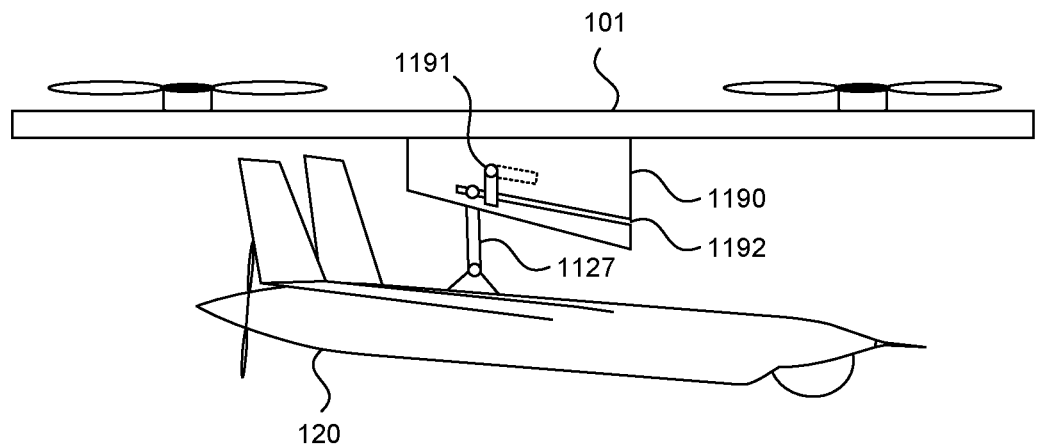
FIG. 11 is a partially schematic illustration of a first aircraft having a launch fixture for carrying a second aircraft, in accordance with an embodiment of the present technology.
Figure 12:
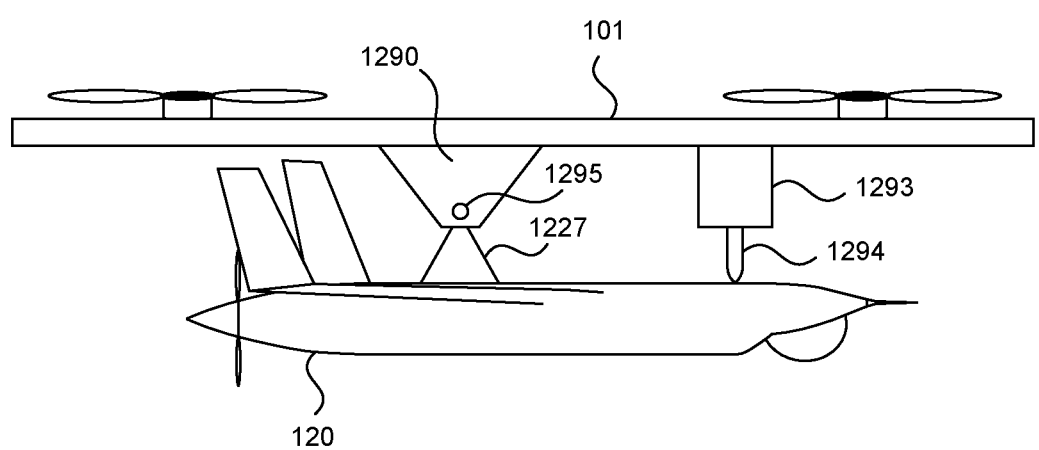
FIG. 12 is partially schematic illustration of a first aircraft having a launch fixture for carrying a second aircraft, in accordance with another embodiment of the present technology.
Figure 13:
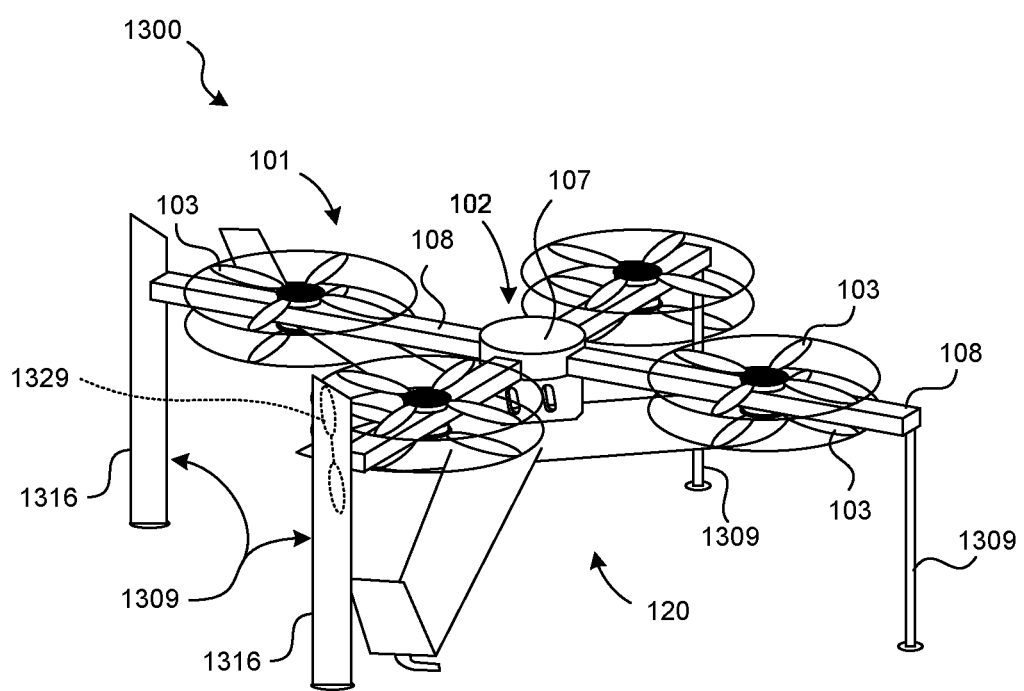
FIG. 13 illustrates a representative first aircraft carrying a representative second aircraft during operations in accordance with an embodiment of the present technology.

FIGS. 11-13 illustrate first and second aircraft configured in accordance with particular embodiments of the present technology. Beginning with FIG. 11, a representative first aircraft 101 can include a launch fixture 1190 releasably attached to an attachment fixture 1127 carried by the second aircraft 120. In a particular aspect of this embodiment, the attachment fixture 1127 fits into a corresponding slot 1192 of the launch fixture 1190, and the launch fixture 1190 further includes a release mechanism 1191. The release mechanism 1191 can obstruct or prevent motion of the attachment fixture 1127 until launch, at which point, the release mechanism 1191 can be moved to a release position (as indicated in dotted lines in FIG. 11), allowing the second aircraft 120 to slide downwardly and away from the first aircraft 101 via the slot 1192.

In an embodiment shown in FIG. 12, the first aircraft 101 includes a launch fixture 1290 configured in accordance with another embodiment of the present technology. The launch fixture 1290 can include a pivot pin 1295 that releasably engages with a corresponding attachment fixture 1227 carried by the second aircraft 120. For example, the pivot pin 1295 can translate into or out of the plane of FIG. 12 to disengage from the attachment fixture 1227. The first aircraft 101 can further include a positioning apparatus 1293 having a plunger 1294 that, when activated, forces the nose of the second aircraft 120 downwardly. During a representative launch operation, the pivot pin 1295 and plunger 1294 are actuated in sequence to both release the second aircraft 120 and force the nose of the second aircraft 120 downwardly so that it (a) picks up sufficient air speed to fly on its own, and (b) reduces the likelihood for interference with the first aircraft 101. For example, in one embodiment, the pin 1295 is disengaged first, and, upon an indication that the pin 1295 has been successfully disengaged, the plunger 1294 then operates to push down the nose of the second aircraft 120. In another embodiment, the plunger 1294 is actuated first to place the second aircraft 120 in a downward-facing orientation, before the pin 1295 is released. In any of these embodiments, the second aircraft 120 can be initially carried in a horizontal attitude, for example, as the first aircraft 101 flies horizontally to a launch site. One advantage of this arrangement is that it is expected to reduce the drag on both the second aircraft 120 and the first aircraft 101 during this flight.

FIG. 13 illustrates further details of a representative system 1300 including the first aircraft 101 and second aircraft 120 shown in FIG. 2. The first aircraft 101 can include an airframe 102 formed by a central portion 107 and multiple, outwardly extending arms 108. Each arm 108 can support one or more rotors 103. For example, in an embodiment shown in FIG. 13, each of the four arms supports two counter-rotating rotors 103. The first aircraft 101 can further include multiple landing gear 1309 and a launch fixture 190 that are configured to allow the first aircraft 101 to support the second aircraft 120 while the first aircraft 101 is on the ground. In this position, the landing gear 1309 provide enough ground clearance for the second aircraft 120 to allow a propeller 1329 of the second aircraft 120 to operate. In this particular embodiment, the landing gear 1309 can include four elements, each configured to support one of the four arms 108. One or more of the landing gear elements (e.g., two) can be further configured to have flat, vertically extending surfaces that operate as vertical stabilizers 1316 to enhance the in-flight stability of the first aircraft 1301.

FIGS. 14A-14D illustrate systems and methods for capturing unmanned aerial vehicles in a marine or other water-based environment, in accordance with further embodiments of the present technology. For purposes of illustration, capture operations are shown in FIGS. 14A-14D. In other embodiments, the same or different aircraft can be used to launch the UAVs, for example, in accordance with the techniques described above.

Figure 14A:
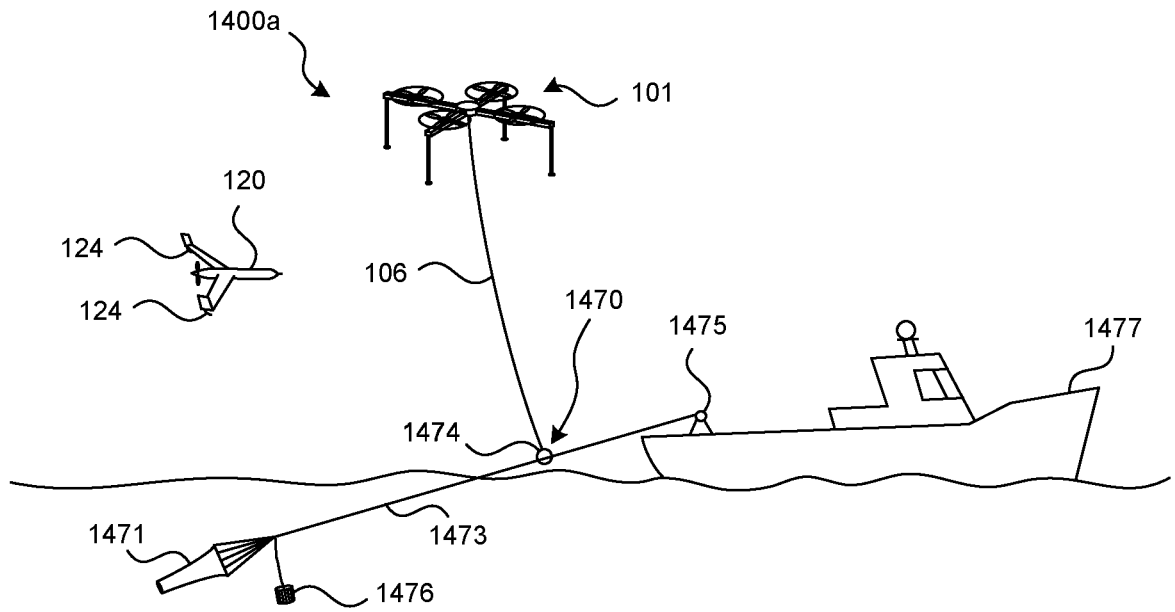
FIG. 14A is a partially schematic illustration of a first aircraft configured to operate in a marine environment, in accordance with an embodiment of the present technology.
Figure 14B:
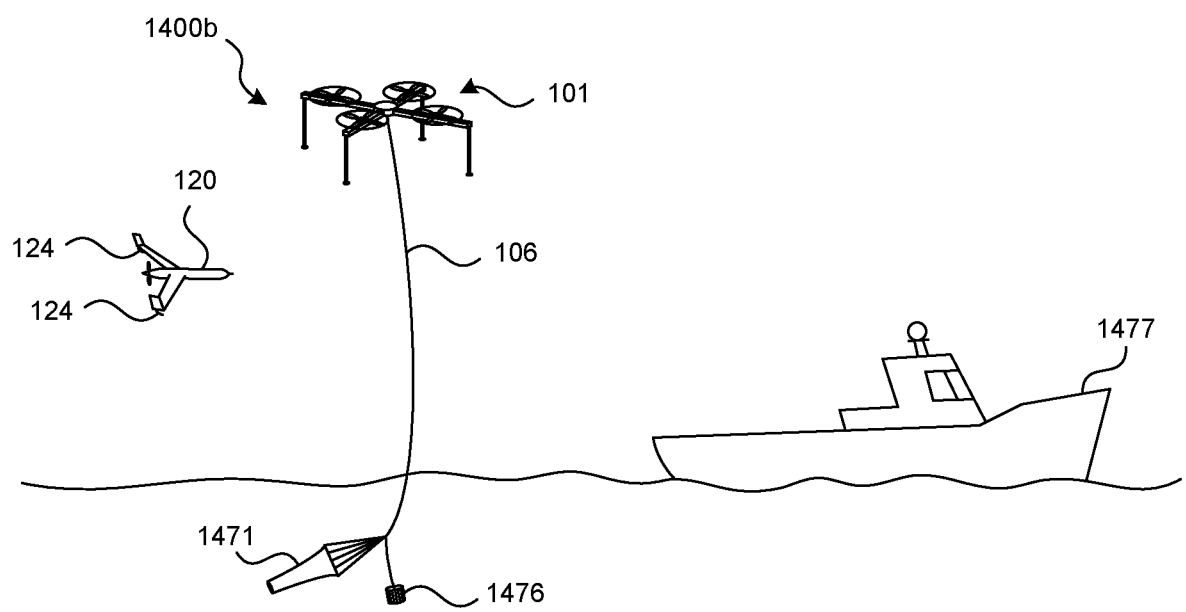

Beginning with FIG. 14A, a representative system 1400a can include a first aircraft 101 configured to capture and/or launch a second aircraft 120. Accordingly, the first aircraft 101 can carry a capture line 106 that is in turn connected to a downline apparatus 1470. The downline apparatus 1470 can be carried at least in part by a water-borne vessel 1477 (e.g., a boat, ship, barge, and/or other suitable platform), and can include a drag cable 1473 connected to the capture line 106 with a connecting device 1474 (e.g., a slip ring or other suitable device). The drag cable 1473 is connected to a drag cable deployment device 1475 (e.g., a winch) that can be used to reel the drag cable 1473 in and out. The drag cable 1473 can be connected at its opposite end to an immersible anchor, e.g., a sea anchor 1471 and (optionally), an additional mass 1476, which keeps the drag cable 1473 in a stable orientation relative to the capture line 106 and the vessel 1477.

In one mode of operation, the second aircraft 120 flies into the capture line 106, engaging wing tip hooks 124 with the capture line 106 in a manner generally similar to that described above. The drag cable deployment device 1475 can then be used to reel in the capture line 106, the sea anchor 1471, and the mass 1476, before or after the first aircraft 101 descends to the vessel 1477 to deposit the captured second aircraft 120.

A system 1400b in accordance with another embodiment (shown in FIGS. 14B-14D) includes a first aircraft 101 that operates without being attached to the vessel 1477 via the drag cable 1473. Instead, the first aircraft 101, with the capture line 106, sea anchor 1471 and optional additional mass 1476, can be delivered by the vessel 1477 to a particular location, and released. After being released, the first aircraft 101 captures the second aircraft 120 in a manner generally similar to that discussed above. The first aircraft 101 then flies the second aircraft 120 to the vessel 1477. For example, as shown in FIG. 14C, the first aircraft 101 can lift the second aircraft 120, the sea anchor 1471 and the additional mass 1476 from the water and fly toward the vessel 1477. At the vessel 1477, as shown in FIG. 14D, the first aircraft 101 can lower the second aircraft 120 to be secured at the vessel 1477, and can then itself land on the vessel 1477.

One aspect of several of the embodiments described above with reference to FIGS. 1-14D is that the disclosed unmanned aerial vehicle systems can include a first, unmanned aircraft that launches, recovers, or both launches and recovers a second, unmanned aircraft. One advantage of this feature is that it allows the second aircraft to be deployed from and returned to sites with very limited access. Accordingly, such systems can operate in areas that are typically inaccessible to second unmanned aircraft having a fixed wing configuration. Because such aircraft typically have a longer endurance than multi-rotor unmanned aerial vehicles, the ability to deploy and recover such aircraft from more remote and inaccessible locations can significantly increase the overall range and endurance of the system.

Another feature of at least some of the foregoing embodiments is that the configurations of the first and second aircraft can differ significantly, in a manner that corresponds with the different missions carried out by the aircraft. For example, the first aircraft can be configured to have a relatively short endurance, and can be configured to take off and land vertically, thus allowing it to operate in confined spaces. The second aircraft, by contrast, can be configured to carry out long-range missions, and can further be configured to be launched and/or captured by the first aircraft.

From the foregoing, it will be appreciated that specific embodiments of the present technology have been described herein for purposes of illustration, but various modifications may be made without deviating from the disclosed technology. For example, the first and second aircraft described above can have configurations other than those expressly shown in the figures. In general, the first aircraft can have a VTOL configuration, and the second aircraft can have a different (e.g., fixed wing) configuration. However, in other embodiments, either or both the first and second aircraft can have other configurations.

As discussed above, the first aircraft can carry out a launch function only, a capture function only, or both a launch and capture function. In particular embodiments, the same aircraft can carry out both launch and capture functions. For example, the first aircraft shown in FIGS. 14A-D can be configured for capture operations (as shown), or launch operations, or both. In other embodiments, different aircraft (e.g., having the same or different configurations) can carry out the launch and capture functions. For example, in some embodiments, one aircraft launches the second aircraft and, while it is being recharged or otherwise prepared for another launch, a different aircraft performs the capture function.

The UAVs described above (e.g., the second aircraft 120) are generally small to medium in size. For example, a representative second aircraft has a takeoff gross weight of between 40 and 55 lbs. In other embodiments, the second aircraft can have other suitable weights.

Several of the embodiments described above were described in the context of obstructed environments, for example, forested environments, crowded urban environments, and/or other such environments. In other embodiments, the same or similar systems can be used in environments that do not have such obstructions.

The first aircraft described above are illustrated as multi-rotor aircraft with four or eight rotors. In other embodiments, the first aircraft can have other rotor configurations (e.g., six rotors). In any of these embodiments, the power sources used to power the first aircraft can include batteries, internal combustion engines, turbines, fuel cells, and/or other suitable sources.

In a particular embodiment for which the first aircraft receives power from a ground-based source (for example, a power cable), the function provided by the power cable can be combined with the function provided by the capture line. For example, the same cable can both carry power to the first aircraft from the ground, and can be used to capture the second aircraft. In such embodiments, the cable is thick enough to carry the required electrical current to the first aircraft, thin enough to engage with the capture device carried by the second aircraft, and robust enough to withstand multiple impacts with the second capture device.

In general, the capture line is not carried aloft during a typical launch operation. In other embodiments, the capture line can be lifted along with the second aircraft during a launch operation. Accordingly, if the second aircraft undergoes a malfunction shortly after launch, the recovery line can be used to retrieve the second aircraft. Such an arrangement may be suitable if the second aircraft can be launched from the first aircraft while the first aircraft hovers, rather than while the first aircraft is engaged in forward flight. In still further embodiments, the first aircraft can carry the recovery line entirely on board, without the recovery line being connected to the ground. The recovery line can accordingly be stowed on board the first aircraft and deployed only when needed for recovery.

When multiple aircraft are deployed to carry out and/or support a launch and/or capture operation (e.g., as discussed above with reference to FIGS. 5A-7), any of the aircraft can be programmed with instructions to operate in concert with each other, in a master/slave arrangement, as discussed above with reference to FIG. 5A, or in another suitable arrangement.

Certain aspects of the technology described in the context of particular embodiments may be combined or eliminated in other embodiments. For example, the launch and recovery functions can be integrated into a single aircraft or divided among multiple aircraft. The sensors described in the context of an embodiment shown in FIGS. 4A-B can be included in other embodiments as well. Further, while advantages associated with certain embodiments of the technology have been described in the context of those embodiments, other embodiments may also exhibit said advantages, and not all embodiments need necessarily exhibit such advantages to follow within the scope of the present technology. Accordingly, the present disclosure and associated technology can encompass other embodiments not expressly described or shown herein.

To the extent any of the materials incorporated herein by reference conflict with the present disclosure, the present disclosure controls.

What is claimed is:

1. An unmanned aerial vehicle (UAV) capture system, the system comprising:
   a first UAV including:
      an airframe, and
      a plurality of rotors coupled to the airframe and configured to support the first UAV in hover;
   a drag cable;
   an immersible anchor configured to be immersed within a body of water; and
   a capture line carried by the first UAV, wherein a first end of the capture line is coupled to the airframe, and wherein a second end of the capture line opposite the first end is coupled to the drag cable, the drag cable supporting the immersible anchor for capture of a second UAV in flight with the capture line.

2. The UAV capture system of claim 1, wherein the drag cable extends between the immersible anchor and a waterborne vessel.

3. The UAV capture system of claim 2, wherein the drag cable is operatively coupled to a winch, and wherein the winch is coupled to the waterborne vessel and configured to reel the drag cable in and out relative to the waterborne vessel.

4. The UAV capture system of claim 3, wherein a first end of the drag cable is coupled to the winch, and wherein a second end of the drag cable opposite the first end of the drag cable is coupled to the immersible anchor.

5. The UAV capture system of claim 4, wherein the second end of the drag cable is further coupled to a weighted mass, the weighted mass configured to maintain the drag cable in a stable orientation relative to the capture line and the waterborne vessel during the capture of the second UAV.

6. The UAV system of claim 5, wherein the weighted mass extends from the drag cable at a first position of the drag cable and the immersible anchor extends from the drag cable at a second position of the drag cable different from the first position.

7. The UAV of claim 6, further including a cable extending between the drag cable and the weighted mass.

8. The UAV capture system of claim 4, wherein the winch is configured to reel in the drag cable, the immersible anchor, and the capture line toward the waterborne vessel when the first UAV carries the second UAV on the capture line when the second UAV is captured.

9. The UAV capture system of claim 1, wherein the second end of the capture line is coupled to the drag cable via a ring.

10. The UAV system of claim 1, wherein the drag cable is further coupled to a weighted mass, the weighted mass configured to maintain the drag cable in a stable orientation relative to the capture line during the capture of the second UAV.

11. The UAV system of claim 1, wherein the first UAV is configured to capture the second UAV via the capture line, and wherein the first UAV is configured to carry the captured second UAV from a first location at which the capture occurred to a second location aboard a waterborne vessel.

12. A method, comprising:
commencing a flight of a first unmanned aerial vehicle (UAV) of a UAV system, the first UAV including:
an airframe;
a plurality of rotors coupled to the airframe and configured to support the first UAV in hover during the flight of the first UAV;
a drag cable;
an immersible anchor; and
a capture line carried by the first UAV, wherein a first end of the capture line is coupled to the airframe, and wherein a second end of the capture line opposite the first end is coupled to the drag cable, the drag cable supporting the immersible anchor; and
immersing the immersible anchor within a body of water for capture of a second UAV in flight with the capture line.

13. The method of claim 12, wherein the drag cable extends between the immersible anchor and a waterborne vessel.

14. The method of claim 13, wherein the second end of the capture line is coupled to the drag cable via a ring.

15. The method of claim 13, wherein the drag cable is operatively coupled to a winch, and wherein the winch is coupled to the waterborne vessel and configured to reel the drag cable in and out relative to the waterborne vessel.

16. The method of claim 15, wherein a first end of the drag cable is coupled to the winch, and wherein a second end of the drag cable opposite the first end of the drag cable is coupled to the immersible anchor.

17. The method of claim 16, wherein the second end of the drag cable is further coupled to a weighted mass, the weighted mass maintaining the drag cable in a stable orientation relative to the capture line and the waterborne vessel during the capture of the second UAV.

18. The method of claim 16, further comprising:
capturing the second UAV via the capture line of the first UAV; and
operating the winch to reel in the drag cable, the immersible anchor, and the capture line toward the waterborne vessel when the first UAV carries the second UAV on the capture line when the second UAV is captured.

19. The method of claim 12, wherein the drag cable is further coupled to a weighted mass, the weighted mass maintaining the drag cable in a stable orientation relative to the capture line during the capture of the second UAV.

20. The method of claim 12, further comprising:
capturing the second UAV via the capture line of the first UAV; and
carrying the second UAV when captured from a first location at which the second UAV became captured to a second location aboard a waterborne vessel.

* * * * *